(12) United States Patent
Mori

(10) Patent No.: US 6,652,983 B1
(45) Date of Patent: Nov. 25, 2003

(54) SHEET FOR IN-MOLD DECORATING AND IN-MOLD DECORATED ARTICLE

(75) Inventor: Fujio Mori, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 09/403,662

(22) PCT Filed: Feb. 25, 1999

(86) PCT No.: PCT/JP99/00868

§ 371 (c)(1),
(2), (4) Date: Oct. 27, 1999

(87) PCT Pub. No.: WO99/43485

PCT Pub. Date: Sep. 2, 1999

(30) Foreign Application Priority Data

Feb. 27, 1998 (JP) .............................................. 10/64435
Sep. 16, 1998 (JP) ............................................. 10/260729
Nov. 24, 1998 (JP) ............................................. 10/331804

(51) Int. Cl.$^7$ ................................................ B32B 27/36
(52) U.S. Cl. ........................ 428/480; 428/478; 428/479
(58) Field of Search ................................. 264/478, 479, 264/480, 642, 645; 428/212, 220

(56) References Cited

U.S. PATENT DOCUMENTS 5,707,697 A    1/1998   Spain et al.

FOREIGN PATENT DOCUMENTS

| EP | 0 933 183 | | 8/1999 |
|---|---|---|---|
| JP | 50-19132 | | 7/1975 |
| JP | 195683 | * | 1/1982 |
| JP | 2647408 | | 5/1997 |
| JP | 9-207166 | | 8/1997 |
| JP | 9-328562 | | 12/1997 |
| JP | 10-15986 | | 1/1998 |
| JP | 10-34696 | | 2/1998 |
| JP | 10-52893 | | 2/1998 |
| JP | 10-100329 | | 4/1998 |
| WO | 92 12008 | | 7/1992 |

* cited by examiner

*Primary Examiner*—Merrick Dixon
(74) *Attorney, Agent, or Firm*—Wenderoth, Lind & Ponack, L.L.P.

(57) ABSTRACT

An in-mold decorating sheet is set in an injection mold and, after clamping the mold, molten molding resin is injected into the mold and allowed to cool and solidified, and part of the in-mold decorating sheet is integrally bonding to a surface of the molding resin, by which a molded resin product is obtained. After these processes, when the in-mold decorating sheet is peeled off from the surface of the molded resin product in compliance with conditions of ASTM D903, the in-mold decorating sheet has a peel strength of at least not less than 1 kgf/inch width or the in-mold decorating sheet breaks before reaching the peel strength. Therefore, an unnecessary portion of the in-mold decorating sheet is easy to trim from the surface of the molded resin product.

34 Claims, 17 Drawing Sheets

SHEET FOR IN-MOLD DECORATING AND IN-MOLD DECORATED ARTICLE

TECHNICAL FIELD

The present invention relates to in-mold decorating sheets, as well as in-mold decorated articles using the same, for use in decorating the surfaces of molded resin products of three-dimensional shape including interior automotive trims such as console boxes, center clusters, and switch bases, exterior automotive trims such as side mudguards, bumpers, wheel covers and braid, and component parts for household electrical appliances such as refrigerator doors and air-conditioner front panels.

BACKGROUND ART

As a surface decorating method, there has been known an in-mold decorating method using an in-mold decorating sheet. This method comprises setting into an injection mold an in-mold decorating sheet with a pattern layer formed thereon, clamping the mold, injecting a molten molding resin into a cavity, and allowing the molding resin to set, where a pattern-layer side of the in-mold decorating sheet is integrally bonded to the surface of the molded resin product, by which an in-mold decorated article is obtained.

After the molding, an unnecessary portion of the in-mold decorating sheet that has not been bonded to the molded resin product is removed by trimming. The trimming process may be a process of burning out an insert film by irradiating a laser beam, a process of making a punch die for trimming and punching an insert film by pressing, a process of removing by human hand as if it were torn, or the like.

However, the in-mold decorating sheets obtained by these processes have had the following issues, respectively.

A first issue is deficiencies of the trimming process, or peeling of the in-mold decorating sheet from the molded resin product during the trimming process.

That is, in the process using a laser beam for trimming, there has been an issue that too much radiation of the laser beam would cause the vicinity of the trimming portion to burn and thereby discolor due to the heat of the laser beam. Also, in the process using a punch die, there has been an issue that too large a pressing force would cause the punch die to deteriorate in sharpness with time. Further, in the process with human hand, there has been an issue that inappropriate work would cause the in-mold decoration sheet to be partly peeled off from the molded resin product before the in-mold decorating sheet is cut. Such issues are caused due to the deficiency in adhesion between the in-mold decorating sheet and the molding resin and/or to the fact that the in-mold decorating sheet itself is hard to cut. Such issues are caused due to the deficiency in adhesion between the in-mold decorating sheet and the molding resin and/or to the fact that the in-mold decorating sheet itself is hard to be cut.

A second issue is the peeling of the in-mold decorating sheet from the molded resin product due to shrinkage of the molding resin. This occurs when there is a large difference between the shrinkage rate of the molded resin product that occurs within 24 hours after the molded resin product that has formed by injecting and then setting the molding resin is removed from the injection mold (i.e., the shrinkage rate of the molding resin), and the shrinkage rate of the in-mold decorating sheet until the in-mold decorating sheet that has been heated during the injection molding turns back to normal temperature (for example, with an interior automotive trim, this issue occurred when the in-mold decorating sheet was an acrylic printed film and the molding resin was polypropylene resin, where the shrinkage rate of the former was about 4/1000 and that for the latter was about 15/1000).

That is, when an in-mold decorating sheet 94 and a molded resin product 93 formed by the setting of molding resin are integrated into an in-mold decorated article 95 (see FIG. 5A) and then cooled, a strong bonding force between the in-mold decorating sheet 94 and the molded resin product 93 of the set molding resin would cause a warp to occur to the whole in-mold decorated article 95 along with a deformation of the molded resin product 93 of the set molding resin (see FIG. 5B).

Also, a weak bonding force between the in-mold decorating sheet 94 and the molded resin product 93 of the set molding resin would cause a minute shift to occur between the bonding surface of the in-mold decorating sheet 94 and the bonding surface of the molded resin product 93 of the set molding resin, resulting in the peeling of the in-mold decorating sheet 94 from the molded resin product 93 of the set molding resin at the end 95a of the in-mold decorated article 95 or other faults (see FIG. 5C).

A third issue is that in a desire for an in-mold decorated article of deep drawing with a design of metallic luster, the pattern layer of the in-mold decorating sheet is largely stretched, causing craze (micro cracks) to occur so that the metallic luster is reduced, making the in-mold decorated article unusable.

In such applications as exterior automotive trims including side braid and bumpers, many products are of metallic-like design. In this case, conventionally, there have been generally used products in each of which an in-mold decorating sheet obtained by dry-laminating both of a film having chromium vacuum-deposited coating formed on a weather-proof polyester film and a bonding film together is integrally bonded to the surface of the molded resin product. However, this is not applied to molded resin products of deep-drawn shape for the aforementioned reason.

Therefore, it is an object of the present invention to provide an in-mold decorating sheet which is free from any deficiency in adhesion with molding resin or which itself is easy to cut, as well as an in-mold decorated article using the in-mold decorating sheet.

A further object of the present invention is to provide an in-mold decorating sheet which is hard to be peeled from the molding resin and is difficult to warp, as well as an in-mold decorated article using the in-mold decorating sheet.

A further object of the present invention is to provide an in-mold decorating sheet in which even in a case of obtaining an in-mold decorated article of deep drawing with a design of metallic luster, even though its pattern layer of the in-mold decorating sheet is largely stretched, the sheet yields less craze (micro cracks), and less reduction in metallic luster, as well as in-mold decorated article using the in-mold decorating sheet.

DISCLOSURE OF THE INVENTION

In order to accomplish the above object(s), the present invention has the following constitutions.

According to a first aspect of the present invention, there is provided an in-mold decorated article obtained by: setting an in-mold decorating sheet in an injection mold; after the mold is clamped, injecting molten molding resin into the mold; after cooling and solidifying of the injected molding resin, integrally bonding a part of the in-mold decorating sheet to a surface of the molding resin; and then, removing a remaining unbonded portion of the in-mold decorating sheet, wherein when the in-mold decorating sheet is peeled off from an interface with the solidified molding resin in compliance with conditions of ASTM D903, the in-mold decorating sheet has a peel strength of at least not less than 1 kgf/inch width or the in-mold decorating sheet breaks at the interface before reaching the peel strength.

According to a second aspect of the present invention, there is provided an in-mold decorated article as defined in the first aspect, wherein a difference in shrinkage rate between the in-mold decorating sheet and the after-solidifying molding resin is 0/1000–8/1000.

According to a third aspect of the present invention, there is provided an in-mold decorated article as defined in the first or second aspect, wherein when a tensile test is carried out with a 10 mm wide test specimen of the in-mold decorating sheet fixed between a pair of chucks with an opposite end edge distance of 100 mm, by applying a load at a constant speed of 5 mm/sec to the test specimen at one end thereof under an ambient temperature condition of 25° C., the test specimen exhibits a tensile strength at break of 0.2–2 kgf.

According to a fourth aspect of the present invention, there is provided an in-mold decorated article as defined in any one of the first to third aspects, wherein the in-mold decorating sheet comprises at least a base sheet and a metallic color layer, and wherein when a 10 mm wide test specimen of the in-mold decorating sheet fixed between a pair of chucks with an opposite end edge distance of 10 mm is elongated up to 20 mm by applying a load at a constant speed of 10 mm/min to one end of the test specimen under an ambient temperature condition of 150° C., the in-mold decorating sheet exhibits a surface specular gloss of not less than 75 at 60° reflection.

According to a fifth aspect of the present invention, there is provided an in-mold decorated article as defined in any one of the first to fourth aspects, wherein the molding resin is polypropylene resin.

According to a sixth aspect of the present invention, there is provided an in-mold decorated article as defined in any one of the first to fourth aspects, wherein the molding resin is polypropylene resin having an after-solidifying shrinkage rate of 4/1000–12/1000.

According to a seventh aspect of the present invention, there is provided an in-mold decorated article according to any one of the first to sixth aspects, wherein a filler material is mixed into the polypropylene molding resin.

According to an eighth aspect of the present invention, there is provided an in-mold decorated article as defined in any one of the first to seventh aspects, wherein a rubber component is mixed into the polypropylene molding resin.

According to a ninth aspect of the present invention, there is provided an in-mold decorated article as defined in any one of the first to eighth aspects, wherein a resin component of a layer, brought into contact with the molding resin, out of print layers of the in-mold decorating sheet is chlorinated polypropylene-series resin.

According to a tenth aspect of the present invention, there is provided an in-mold decorated article as defined in any one of the first to ninth aspects, wherein the in-mold decorating sheet has at least a pattern layer formed in a base sheet, and wherein when a tensile test is carried out with a 10 mm wide test specimen of the base sheet fixed between a pair of chucks with a chuck-to-chuck distance of 100 mm, by applying a load at a constant speed of 500 mm/min to the test specimen at one end thereof under an ambient temperature condition of 40° C., the test specimen exhibits a tensile strength at break of not less than 850 gf.

According to an eleventh aspect of the present invention, there is provided an in-mold decorated article as defined in any one of the first to tenth aspects, wherein when a tensile test is carried out with a 10 mm wide test specimen of the in-mold decorating sheet fixed between a pair of chucks with a chuck-to-chuck distance of 100 mm, by applying a load at a constant speed of 3 mm/sec to the test specimen at one end thereof under an ambient temperature condition of 110° C., the test specimen exhibits a tensile elongation at break of not less than 150%.

According to a twelfth aspect of the present invention, there is provided an in-mold decorated article as defined in any one of the first to eleventh aspects, wherein the base sheet of the in-mold decorating sheet is an acrylic film having a thickness of 50–200 $\mu$m or a polycarbonate film having a thickness of 30–150 $\mu$m.

According to a thirteenth aspect of the present invention, there is provided an in-mold decorated article as defined in any one of the first to eleventh aspects, wherein the base sheet of the in-mold decorating sheet is a polyvinyl alcohol film having a thickness of 50–800 $\mu$m.

According to a fourteenth aspect of the present invention, there is provided an in-mold decorated article as defined in any one of the first to thirteenth aspects, wherein the in-mold decorating sheet comprises at least a base sheet and a metallic color layer, the metallic color layer being a 50–800 Å thick indium metal thin film, a 300–600 Å thick tin metal thin film, or a 1.0–3.0 $\mu$m thick metal powder ink film.

According to a fifteenth aspect of the present invention, there is provided an in-mold decorated article as defined in any one of the first to thirteenth aspects, wherein the in-mold decorating sheet comprises at least a base sheet and a metallic color layer, the metallic color layer being a 100–600 Å thick indium metal thin film.

According to a sixteenth aspect of the present invention, there is provided an in-mold decorating sheet for obtaining an in-mold decorated article by: setting the in-mold decorating sheet in an injection mold; after the mold is clamped, injecting molten molding resin into the mold; after cooling and solidifying of the injected molding resin, integrally bonding a part of the in-mold decorating sheet to a surface of the molding resin; and then, removing a remaining unbonded portion of the in-mold decorating sheet, wherein when the in-mold decorating sheet is peeled off from an interface with the solidified molding resin in compliance with conditions of ASTM D903, the in-mold decorating sheet has a peel strength of at least not less than 1 kgf/inch width or the in-mold decorating sheet breaks at the interface before reaching the peel strength.

According to a seventeenth aspect of the present invention, there is provided an in-mold decorating sheet as defined in the sixteenth aspect, wherein a difference in shrinkage rate between the in-mold decorating sheet and the after-solidifying molding resin is 0/1000–8/1000.

According to an eighteenth aspect of the present invention, there is provided an in-mold decorating sheet as defined in the sixteenth or seventeenth aspect, wherein when a tensile test is carried out with a 10 mm wide test specimen of the in-mold decorating sheet fixed between a pair of chucks with an opposite end edge distance of 100 mm, by applying a load at a constant speed of 5 mm/sec to the test specimen at one end thereof under an ambient temperature condition of 25° C., the test specimen exhibits a tensile strength at break of 0.2–2 kgf.

According to a nineteenth aspect of the present invention, there is provided an in-mold decorating sheet as defined in any one of the sixteenth to eighteenth aspects, wherein the in-mold decorating sheet comprises at least a base sheet and a metallic color layer, and wherein when a 10 mm wide test specimen of the in-mold decorating sheet fixed between a pair of chucks with an opposite end edge distance of 10 mm is elongated up to 20 mm by applying a load at a constant speed of 10 mm/min to one end of the test specimen under an ambient temperature condition of 150° C., the in-mold decorating sheet exhibits a surface specular gloss of not less than 75 at 60° reflection. According to a twentieth aspect of the present invention, there is provided an in-mold decorating sheet as defined in any one of the sixteenth to nineteenth aspects, wherein the molding resin is polypropylene resin.

According to a twenty-first aspect of the present invention, there is provided an in-mold decorating sheet wherein in the in-mold decorated article as defined in any one of the sixteenth to twentieth aspects, the molding resin is polypropylene resin having an after-solidifying shrinkage rate of 4/1000–12/1000.

According to a twenty-second aspect of the present invention, there is provided an in-mold decorating sheet wherein in the in-mold decorated article as defined in any one of the sixteenth to twenty-first aspects, a filler material is mixed into the polypropylene molding resin.

According to a twenty-third aspect of the present invention, there is provided an in-mold decorating sheet wherein in the in-mold decorated article as defined in any one of the sixteenth to twenty-second aspects, a rubber component is mixed into the polypropylene molding resin.

According to a twenty-fourth aspect of the present invention, there is provided an in-mold decorating sheet as defined in any one of the sixteenth to twenty-third aspects, wherein a resin component of a layer, brought into contact with the molding resin, out of print layers of the in-mold decorating sheet is chlorinated polypropylene-series resin.

According to a twenty-fifth aspect of the present invention, there is provided an in-mold decorating sheet as defined in any one of the sixteenth to twenty-fourth aspects, wherein the in-mold decorating sheet has at least a pattern layer formed in a base sheet, and wherein when a tensile test is carried out with a 10 mm wide test specimen of the base sheet fixed between a pair of chucks with a chuck-to-chuck distance of 100 mm, by applying a load at a constant speed of 500 mm/min to the test specimen at one end thereof under an ambient temperature condition of 40° C., the test specimen exhibits a tensile strength at break of not less than 850 gf.

According to a twenty-sixth aspect of the present invention, there is provided an in-mold decorating sheet as defined in any one of the sixteenth to twenty-fifth aspects, wherein when a tensile test is carried out with a 10 mm wide test specimen of the in-mold decorating sheet fixed between a pair of chucks with a chuck-to-chuck distance of 100 mm, by applying a load at a constant speed of 3 mm/sec to the test specimen at one end thereof under an ambient temperature condition of 110° C., the test specimen exhibits a tensile elongation at break of not less than 150%.

According to a twenty-seventh aspect of the present invention, there is provided an in-mold decorating sheet as defined in any one of the sixteenth to twenty-sixth aspects, wherein the base sheet of the in-mold decorating sheet is an acrylic film having a thickness of 50–200 μm or a polycarbonate film having a thickness of 30–150 μm.

According to a twenty-eighth aspect of the present invention, there is provided an in-mold decorating sheet as defined in any one of the sixteenth to twenty-sixth aspects, wherein the base sheet of the in-mold decorating sheet is a polyvinyl alcohol film having a thickness of 50–800 μm.

According to a twenty-ninth aspect of the present invention, there is provided an in-mold decorating sheet as defined in any one of the sixteenth to twenty-eighth aspects, the in-mold decorating sheet comprising at least a base sheet and a metallic color layer, the metallic color layer being a 50–800 Å thick indium metal thin film, a 300–600 Å thick tin metal thin film, or a 1.0–3.0 μm thick metal powder ink film.

According to a thirtieth aspect of the present invention, there is provided an in-mold decorating sheet as defined in any one of the sixteenth to twenty-eighth aspects, wherein the in-mold decorating sheet comprises at least a base sheet and a metallic color layer, the metallic color layer being a 100–600 Å thick indium metal thin film.

According to a thirty-first aspect of the present invention, there is provided a method for manufacturing a three-dimensionally worked in-mold decorated article as defined in any one of the sixteenth to thirtieth aspects, comprising: setting the in-mold decorating sheet into a mold with the in-mold decorating sheet as defined in any one of the sixteenth to thirtieth aspects and being three-dimensionally worked; and simultaneously with forming a molded resin product after the mold is clamped, integrally bonding the in-mold decorating sheet to a surface of the molded resin product.

According to a thirty-second aspect of the present invention, there is provided a method for manufacturing an in-mold decorating article, comprising: setting into a mold the in-mold decorating sheet as defined in any one of the sixteenth to thirtieth aspects; three-dimensionally working the in-mold decorating sheet within the molded; and simultaneously with forming a molded resin product after the mold is clamped, integrally bonding the in-mold decorating sheet to a surface of the molded resin product.

According to a thirty-third aspect of the present invention, there is provided an in-mold decorated article which is manufactured by the in-mold decorated article manufacturing method as defined in the thirty-first or thirty-second aspect.

According to a thirty-fourth aspect of the present invention, there is provided an in-mold decorated article as defined in any one of the tenth to twelfth aspects, wherein the pattern layer is an organic-solvent soluble ink layer.

According to a thirty-fifth aspect of the present invention, there is provided an in-mold decorated article as defined in any one of the tenth, eleventh, and thirteenth aspects, wherein the pattern layer is a water-soluble ink layer.

According to a thirty-sixth aspect of the present invention, there is provided an in-mold decorating sheet as defined in any one of the sixteenth to twenty-seventh aspects, wherein the pattern layer is an organic-solvent soluble ink layer.

According to a thirty-seventh aspect of the present invention, there is provided an in-mold decorating sheet as defined in any one of the sixteenth to twenty-sixth, and twenty-eighth aspects, wherein the pattern layer is a water-soluble ink layer.

BRIEF DESCRIPTION OF THE DRAWINGS

These and other aspects and features of the present invention will become clear from the following description taken in conjunction with the preferred embodiments thereof with reference to the accompanying drawings, in which.

Figure 1A:
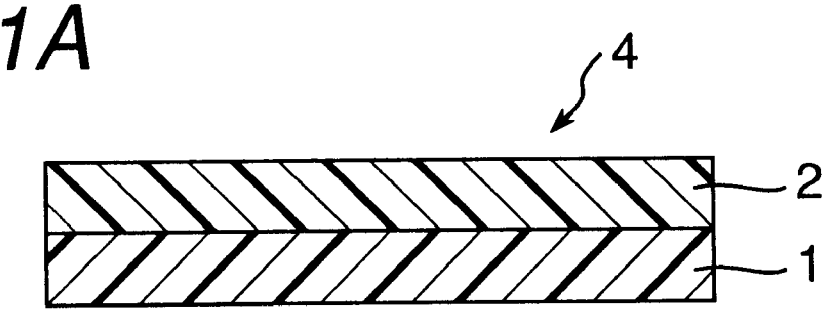
FIGS. 1A and 1B are enlarged sectional views of an example and a modification, respectively, of an in-mold decorating sheet according to a second embodiment of the present invention.

Best Mode for Carrying Out the Invention

Before the description of the present invention proceeds, it is to be noted that like parts are designated by like reference numerals throughout the accompanying drawings.

Hereinbelow, in-mold decorating sheets as well as in-mold decorated articles using the in-mold decorating sheets, according to various embodiments of the present invention are described in detail with reference to the accompanying drawings.

Embodiments of the present invention are first briefly explained in outline, and then the individual embodiments are described in detail.

An in-mold decorating sheet and an in-mold decorated article using the in-mold decorating sheet, according to a first embodiment, are characterized in that the in-mold decorated article is obtained by a process comprising: setting an in-mold decorating sheet in an injection mold; after the mold is clamped, injecting molten molding resin into the mold; after cooling an setting of the injected molding resin, integrally bonding a part of the in-mold decorating sheet to a surface of the molding resin; then, removing a remaining unbonded portion of the in-mold decorating sheet, wherein when the in-mold decorating sheet is peeled off from an interface with the set molding resin in compliance with conditions of JS K 6744-992 (ASTM D903), the in-mold decorating sheet has a peel strength of at least not less than 1 kgf/inch width or the in-mold decorating sheet breaks at the interface before the sheet reaches the peel strength.

That is, it is essential for the in-mold decorating sheet to be firmly in strong adhesion with the molding resin, and as a result of a test for the necessary adhesive force, it was found that a peel strength of at least 1 kgf/inch width or more is necessary when the in-mold decorating sheet is peeled off from the interface with the molding resin according to the conditions of JIS K 6744-1992 (ASTM D903).

Figure 5A:
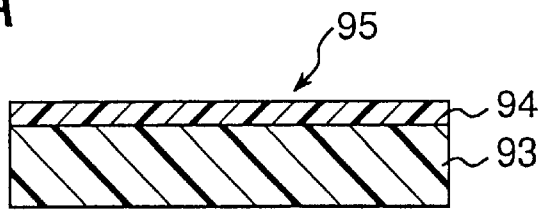
FIGS. 5A, 5B, and 5C are sectional views for explaining molded resin products manufactured by prior art methods for manufacturing an acrylic film insert-molded article.
Figure 5B:
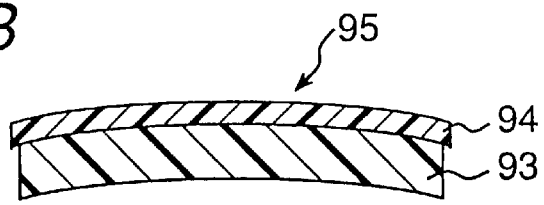
Figure 5C:
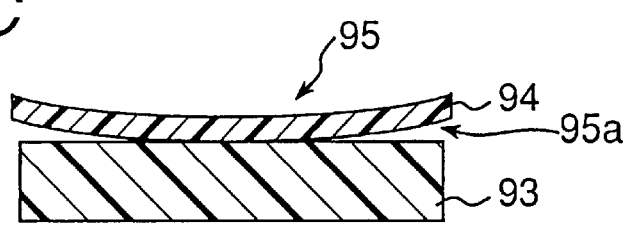

Next, an in-mold decorating sheet and an in-mold decorated article using the in-mold decorating sheet, according to a second embodiment of the present invention, are characterized in that a difference in shrinkage rate between the in-mold decorating sheet and the after-solidifying molding resin is 0/1000–8/1000. That is, it is important that the difference in shrinkage rate between the in-mold decorating sheet and the after-solidifying molding resin is small, making it necessary to select materials so that the difference is 0/1000 to 8/1000 as a result of a test. As described before, even with a strong bonding force between the in-mold decorating sheet and the molded resin product of the set molding resin, there is an issue that a warp occurs to the whole in-mold decorated article along with a deformation of the molded resin product of the set molding resin (see FIG. 5B). To solve this issue, it is indispensable to reduce the difference in shrinkage rate between the in-mold decorating sheet and the after-solidifying molding resin. As a result of performing a test in a seek for a range of the difference, it was found that the range needs to be from 0/1000 to 8/1000.

If the difference falls outside this range, it is preferable to modify either the in-mold decorating sheet or the molding resin so that its shrinkage rate approaches that of the other. For the modification, it is technically easier to make a choice of lowering the shrinkage rate of the material having the larger shrinkage rate by charging a filler agent or the like thereinto.

For example, when the in-mold decorating sheet is an acrylic print film and the molding resin is polypropylene resin, it is technically easier to modify polypropylene resin by charging a filler agent or the like into polypropylene resin so that the shrinkage rate becomes 4/1000–12/1000. In addition, in the case where the molding resin is polypropylene resin, chlorinated polypropylene-series resin is preferably selected as the resin component of a layer brought into contact with the molding resin out of print layers of the in-mold decorating sheet in terms of adhesion and heat resistance. Also, more preferably, a rubber component is mixed into the polypropylene molding resin, in which case a stronger bonding force is obtained.

Next, an in-mold decorating sheet and an in-mold decorated article using the in-mold decorating sheet, according to a third embodiment of the present invention, are characterized in that when a tensile test is carried out with a 10 mm wide test specimen of the in-mold decorating sheet fixed between a pair of chucks with an opposite end edge distance of 100 mm, by applying a load at a constant speed of 5 mm/sec to the test specimen at one end thereof under an ambient temperature condition of 25° C., the test specimen exhibits a tensile strength at break of 0.2–2 kgf.

That is, other than the arrangement of the first embodiment in which the in-mold decorating sheet requires the aforementioned peel strength, the in-mold decorating sheet may alternatively be made easier to break to such an extent that easier trimming is ensured and that no faults occur in the other processes, as in this third embodiment. As a result of a test for this extent, it was found that when a tensile test is carried out with a 10 mm wide test specimen of the in-mold decorating sheet fixed between a pair of chucks with an opposite end edge distance of 100 mm, by applying a load at a constant speed of 5 mm/sec to the test specimen at one end thereof under an ambient temperature condition of 25° C., the test specimen should exhibit a tensile strength at break of 0.2–2 kgf.

In particular, in the case where the in-mold decorating sheet has a pattern layer formed on the base sheet, it is more preferable that the in-mold decorating sheet exhibits a tensile strength at break of not less than 30 gf when a tensile test is carried out with a 10 mm wide test specimen of the in-mold decorating sheet fixed between a pair of chucks with an opposite end edge distance of 100 mm, by applying a load at a constant speed of 1 m/min to the test specimen at one end thereof under an ambient temperature condition of 40° C., because there occur no faults during the process of forming the pattern layer on the base sheet.

Also, in the case where the in-mold decorated article is formed into a deep-drawn three-dimensional shape, it is more preferable that the in-mold decorating sheet exhibits a tensile elongation at break of not less than 150% when a tensile test is carried out with a 10 mm wide test specimen of the in-mold decorating sheet fixed between a pair of chucks with a chuck-to-chuck distance of 100 mm, by applying a load at a constant speed of 3 mm/sec to the test specimen at one end thereof under an ambient temperature condition of 110° C., because there occur no faults during the process of forming the three-dimensional shape.

Next, an in-mold decorating sheet and an in-mold decorated article using the in-mold decorating sheet, according to a fourth embodiment of the invention, are characterized in that the in-mold decorating sheet comprises at least a base sheet and a metallic color layer, and that when a 10 mm wide test specimen of the in-mold decorating sheet fixed between a pair of chucks with an opposite end edge distance of 10 mm is elongated up to 20 mm by applying a load at a constant speed of 10 mm/min to one end of the test specimen under an ambient temperature condition of 150° C., the in-mold decorating sheet exhibits a surface specular gloss of not less than 75 at 60° reflection.

That is, it was found that in a desire for an in-mold decorated article of deep drawing with a design of metallic luster, as a result of the test, the in-mold decorating sheet needs to have a characteristic that the surface specular gloss at 60° reflection is not less than 75 even when the 10 mm wide test specimen of the in-mold decorating sheet fixed between the pair of chucks with the opposite end edge distance of 10 mm is elongated up to 20 mm by applying the load at the constant speed of 10 mm/min to the one end of the test specimen under the ambient temperature condition of 150° C. As described before, in a desire for an in-mold decorated article of deep drawing with a design of metallic luster, there is an issue that the pattern layer of the in-mold decorating sheet is largely stretched, causing craze (micro cracks) to occur so that the metallic luster is reduced, making the in-mold decorated article unusable. Therefore, it was found that, in order to solve this issue, the metallic color layer of the in-mold decorating sheet needs to have such a specular gloss that the surface specular gloss at 60° reflection is not less than 75 even when the 10 mm wide test specimen of the in-mold decorating sheet fixed between the pair of chucks with the opposite end edge distance of 10 mm is elongated up to 20 mm by applying the load at the constant speed of 10 mm/min to the one end of the test specimen under the ambient temperature condition of 150° C.

The metallic color layer having such a characteristic is exemplified by a 50–800 Å thick indium metal thin film, a 300–600 Å thick tin metal thin film, a 1.0–3.0 $\mu$m thick metal powder ink film, or the like. The metal powder ink is preferably one composed of metal powder and resin binder, the metal powder being aluminum or other metal powder having such a particle size distribution that particles having an oblateness of 100–250 and a particle diameter of 4–45 $\mu$m occupy a content ratio of 99% or more. In particular, an indium metal thin film having a thickness of 100–600 Å is good and capable of providing a metallic luster equivalent to that of metal plating, visually.

The metal thin film may be formed by a vacuum deposition process, a sputtering process, an ion plating process, or the like. The metal powder ink film maybe formed by a printing process such as gravure printing or screen printing, or a coating process such as reverse coating or dip coating. In addition, these metal thin films and metal powder ink film may be formed in lamination, or a metal thin film may be formed by mixing two or more kinds of metals.

For the manufacturing of the in-mold decorated articles according to the first to fourth embodiments of the invention, two kinds of methods are available.

As a first method, the method comprises: setting a three-dimensionally worked in-mold decorating sheet according to any one of the first to fourth embodiments into a mold; and after the mold is clamped, simultaneously with forming a molded resin product, integrally bonding the in-mold decorating sheet to a surface of the molded resin product.

As a second method, the method comprises: setting an in-mold decorating sheet according to any of the first to fourth embodiments into a mold; three-dimensionally working the in-mold decorating sheet in the mold; and after the mold is clamped, simultaneously with forming a molded resin product, integrally bonding the in-mold decorating sheet to a surface of the molded resin product.

Next, as for the detailed description of the in-mold decorating sheet and the in-mold decorated article according to the first embodiment with reference to the accompanying drawings, the arrangement of the injection mold, the method for manufacturing the in-mold decorated article, appearances of the sheet and the in-mold decorated article, and the like are utterly or generally the same as in the third embodiment, and so will be explained in detail along with the description of the third embodiment.

Therefore, here are explained, in advance, an in-mold decorating sheet as well as an in-mold decorated article according to the second embodiment are explained in more detail.

The method for manufacturing an in-mold decorated article (insert-molded acrylic film) according to the second embodiment comprises: setting into an injection mold an in-mold decorating sheet (acrylic printing insert film in this case) in which a printing layer having at least a pattern layer has been formed on an acrylic film; after the mold is clamped, injecting molten polypropylene molding resin into a cavity thereof, and integrally bonding a print-layer side of the acrylic printing insert film to the molded resin product of the set polypropylene molding resin, wherein a difference in shrinkage rate between the in-mold decorating sheet and the after-solidifying molding resin is 0/1000–8/1000. As a concrete example, polypropylene, when used as the molding resin, should be such that the difference in shrinkage rate between the in-mold decorating sheet and the after-solidifying molding resin is 4/1000–12/1000.

The method for manufacturing an in-mold decorated article (insert-molded acrylic film) according to the second embodiment comprises: setting into an injection mold an in-mold decorating sheet (acrylic printing insert film in this case) in which a printing layer having at least a pattern layer has been formed on any acrylic film; after the mold is clamped, injecting molten polypropylene molding resin into a cavity thereof, and integrally bonding a print-layer side of the acrylic printing insert film to the molded resin product of the set polypropylene molding resin, wherein a difference in shrinkage rate between the in-mold decorating sheet and the after-solidifying molding resin is 0/1000–8/1000. As a concrete example, polypropylene, when used as the molding resin, should be such that the difference in shrinkage rate between the in-mold decorating sheet and the after-solidifying molding resin is 4/1000–12/1000.

With reference to FIGS. 1A to 4, an acrylic printing insert film applicable to this manufacturing method is explained. In the figures, reference numeral 1 denotes a base sheet of an in-mold decorating sheet; 2 denotes a pattern layer on the base sheet 1; 3 denotes an adhesion layer on the pattern layer 2; 4 denotes an in-mold decorating sheet; 5 denotes a movable mold of an injection mold; 6 denotes a stationary mold composing the injection mold in combination with the movable mold 5; 7 denotes cavity forming surfaces of the movable mold 5; 7 denotes cavity forming surfaces of the movable mold 5 and the stationary mold 6; 8 denotes a clamp member for fixing the in-mold decorating sheet 4 to the surface of the movable mold 5; 9 denotes a gate portion of the stationary mold 6; 10 denotes a molding resin to be injected into the cavity, such as polypropylene; 11 denotes a molded resin product formed by the molding resin 10; 12 denotes a vacuum suction hole of the movable mold 5; and 13 denotes a cavity formed by the movable mold 5 and the stationary mold 6.

Figure 1B:
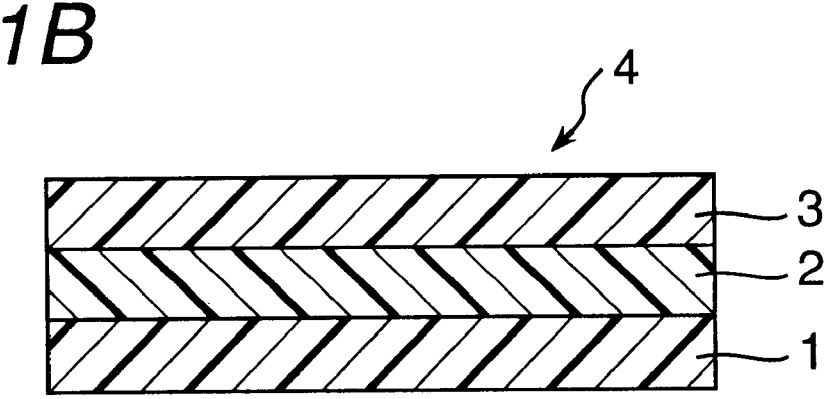

The acrylic printing insert film 4 as an example of the in-mold decorating sheet 4 is, for example, one in which, as shown in FIG. 1A, a print layer having at least the pattern layer 2 is formed on an acrylic film 1 as an example of the base sheet 1. The in-mold decorating sheet 4 may be another in which, as shown in FIG. 1B, an adhesion layer 3 is further provided on the pattern layer 2 as another print layer. The print layer for forming the pattern layer 2 or the adhesion layer 3 may be formed by an ordinary printing process such as offset printing, gravure printing, or screen printing, or a coating process such as roll coating or spray coating.

As the acrylic film 1, 30–250 μm thick ones are available. Further, another resin film such as a fluoric film may be laminated on the acrylic film 1.

The pattern layer 2 is a print layer formed by printing on the overall or a part of the surface of the acrylic film 1. This pattern layer 2 is used for expression of characters, graphics, symbols, or the like on the surface of the molded resin product 11, expression of a colored surface, or other purposes. In addition, the expression of characters, graphics, symbols, or the like, expression of a colored surface, or other purposes may be achieved also by a metal vacuum-deposited layer formed by a vacuum-deposited layer. The pattern layer 2 is constructed by at least one layer selected from a group consisting of a pigment/ink layer composed of pigment and resin binder, a glitter pigment layer composed of pearl pigment and resin binder, and a dye/ink layer composed of dye and resin binder.

The adhesion layer 3 is a print layer for improving the later-described adhesion with the polypropylene molding resin 10, i.e., with the molded resin product 11. The adhesion layer 3 may be formed of a polyvinyl chloride-vinyl acetate copolymer resin, acrylic resin, urethane resin, or the like.

Heat resistance of the pattern layer 2 is improved by using chlorinated polypropylene-series resin, which is a modified polypropylene resin, as the resin component of a layer brought into contact with the molding resin 10 out of the pattern layer 2 of the acrylic printing insert film 4. The heat resistance is further improved by increasing the degree of chlorination of the chlorinated polypropylene-series resin. Also, when the acrylic printing insert film 4 is wound up, the phenomenon that the acrylic film 1 and the pattern layer 2 adhere to each other so as to be unlikely to separate from each other at normal temperatures (i.e., a blocking phenomenon occurs) can be suppressed.

The method for manufacturing this acrylic film insert-molded article is described.

Figure 2A:
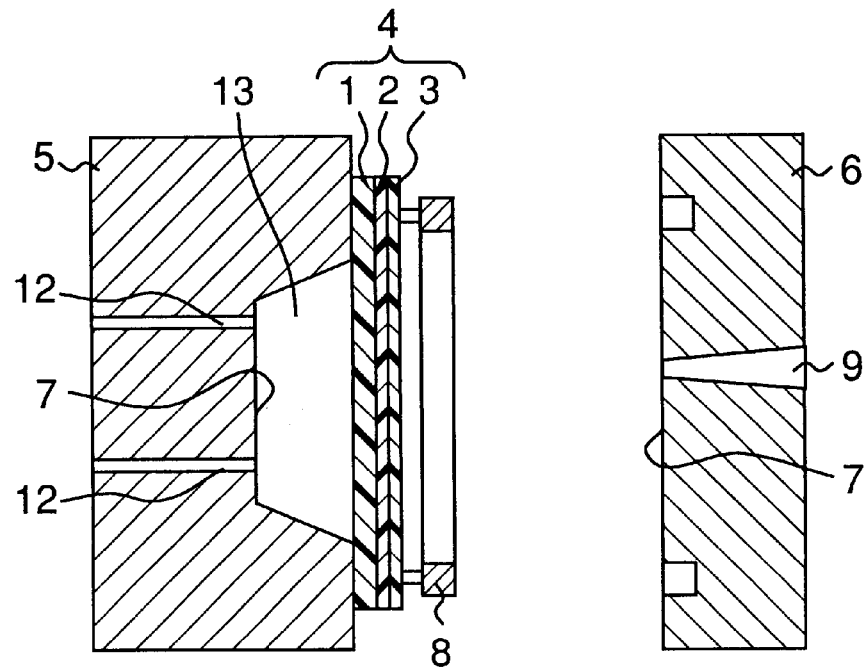
FIG. 2A is a sectional view showing one of the processes of a method for manufacturing an acrylic film insert-molded article, which is an example of an in-mold decorated article including the in-mold decorating sheet of the second embodiment of the invention.

First, the acrylic printing insert film 4 as described above is set to the movable mold 5 of the injection mold which is composed of the movable mold 5 and the stationary mold 6 as shown in FIG. 2A.

A concrete example of the way of setting the acrylic printing insert film 4 into the movable mold 5 for molding process is as follows. An acrylic printing insert film 4 of long size is wound on a roll shaft into a roll, form once, and this roll form sheet is placed on a top portion of the movable mold 5 of the injection mold integrally movably with the movable mold 5. While being paid out from the roll form winding, the acrylic printing insert film 4 is allowed to pass through the space between the shunted movable mold 5 and the stationary mold 6, by which the acrylic printing insert film 4 is set to the movable mold 5. In this case, after the use of the acrylic printing insert film 4, the acrylic printing insert film 4 may be wound up by the roll shaft of film winding means installed below the movable mold 5. As another example, with the use of the acrylic printing insert film 4 in a leaf form, the acrylic printing insert film 4 may be set to the movable mold 5 by a robot or human hand. In this case, after the acrylic printing insert film 4 is set to the movable mold 5 and the position of the acrylic printing insert film 4 relative to the movable mold 5 is determined, the acrylic printing insert film 4 may appropriately be pressed against the surface of the movable mold 5 with the frame-shaped clamp member 8.

Otherwise, before the acrylic printing insert film 4 is set to be movable mold 5, the acrylic printing insert film 4 may be worked into a three-dimensional shape by a vacuum molding process with a mold other than the movable mold 5 and punched into a desired shape. The desired shape is, for example, a shape coincident with the cavity forming surface 7 of an injection mold, for example, the movable mold 5, or other shapes. For three-dimensional working, there is a vacuum molding method, a pressure forming method, a pressing and molding method in which heated rubber is pressed against an object, or a press molding method. The vacuum molding method is a method in which the acrylic printing insert film 4 is heated to a temperature equal to or higher than the softening point to become softened, the space between the recessed portion of the vacuum forming mold and the acrylic printing insert film 4 is closed, and vacuum suction is carried out to cause the acrylic printing insert film 4 to closely adhere to the interior surface of the recessed portion of the vacuum forming mold, by which the acrylic printing insert film 4 is formed into a three-dimensional shape conforming to the cavity form surface 7 of the movable mold 5. For punching to a desired shape, there are a Thomson punching method and a pressing method using a mold. As the punched configuration, there are lines extending along an outer periphery of the acrylic printing insert film having a given configuration, holes of a given shape, and the like. In three-dimensionally working, punching may be carried out simultaneously.

Figure 2B:
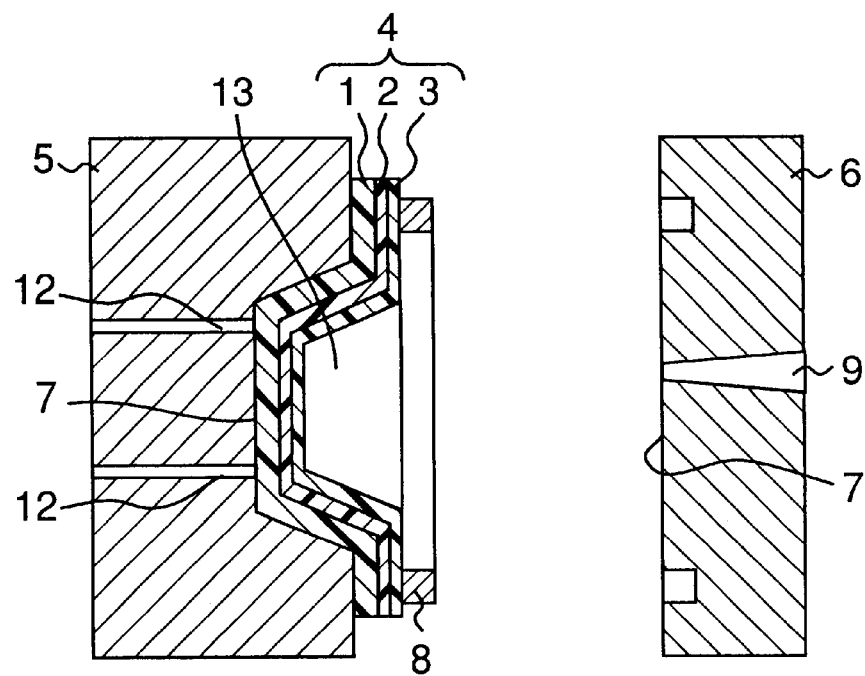
FIG. 2B is a sectional view showing one of the processes of the method for manufacturing the acrylic film insert-molded article.
Figure 8:
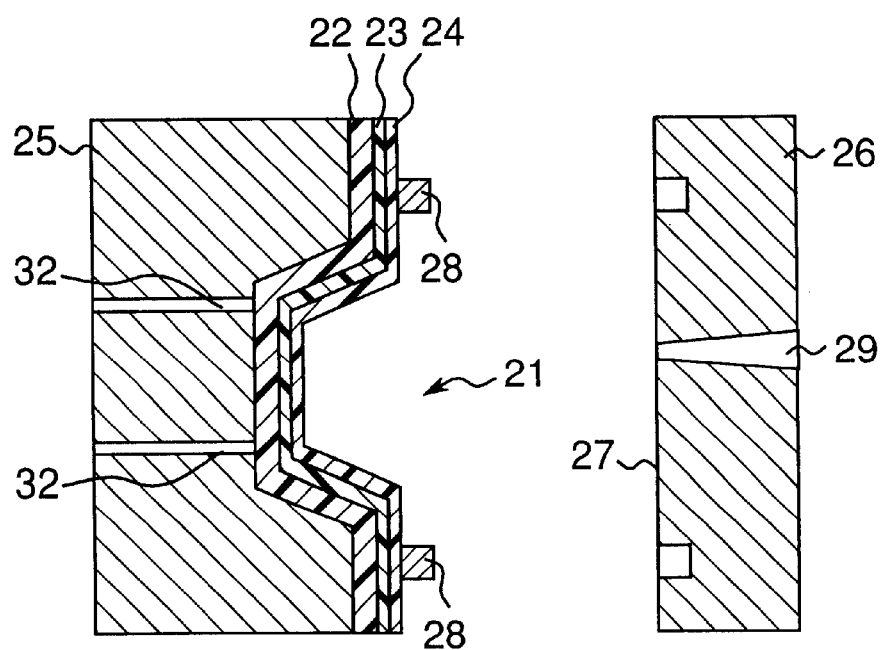
FIG. 8 is a sectional view showing one process of the method for manufacturing the insert-molded article with the insert film of the third embodiment.

Otherwise, after the acrylic printing insert film 4 is set to the movable mold 5, the acrylic printing insert film 4 may be three-dimensionally worked so as to be shaped along the recessed portion of the movable mold 5 forming a part of the cavity 13 by vacuum molding with the use of the movable mold 5 as shown in FIG. 2B (see FIG. 8 of the third embodiment). A concrete example is a method in which the acrylic printing insert film 4 is heated to a temperature equal to or higher than the softening point to become softened by means of a heating plate or the like inserted between the movable mold 5 and the stationary mold 6, the space between the recessed portion of the movable mold 5 and the acrylic printing insert film 4 is tightly closed, and vacuum suction is carried out by evacuating the space through the vacuum suction holes 12 to cause the acrylic printing insert film 4 to closely adhere to the interior surface of the recessed portion of the movable mold 5. In three-dimensionally working, or in pressing and fixing the acrylic printing insert film 4 with the clamp member 8, an unnecessary portion of the acrylic printing insert film 4 may be punched out.

Figure 3:
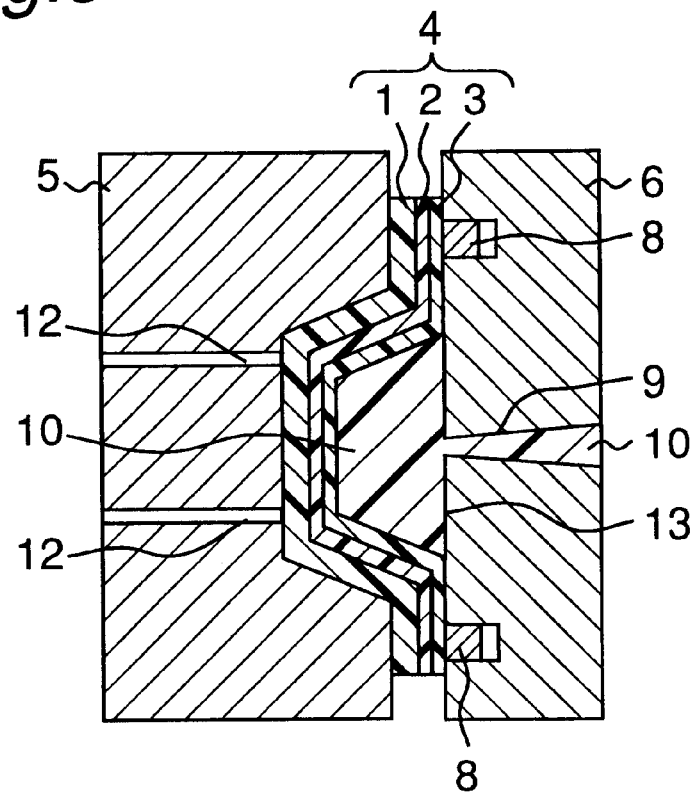
FIG. 3 is a sectional view showing one of the processes of the method for manufacturing the acrylic film insert-molded article.

Next, as shown in FIG. 3, after the movable mold 5 is moved toward the side of the stationary mold 6 and the two molds are clamped, the molding resin 10 in a molten state is injected into the cavity 13 defined by the movable mold 5 and the stationary mold 6 through the gate portion 9 of the stationary mold 6, and then the acrylic printing insert film 4 is integrally bonded on its pattern layer side to the molded resin product 11 of the set polypropylene molding resin 10.

Figure 4:
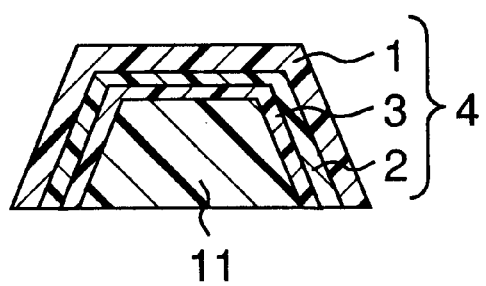
FIG. 4 is a sectional view showing the acrylic film insert-molded article.

Thereafter, an unnecessary portion, for example an unbonded portion, of the acrylic printing insert film 4 bonded to the molded resin product 11 may be removed as shown in FIG. 4.

The injection mold is, for example, one which is constructed by the stationary mold 6 having the gate portion 9 for injecting the molding resin 10, the movable mold 5, and the like, and in which the stationary mold 6 and the movable mold 5, when clamped, form a singularity or plurality of cavities 13 surrounded by the cavity forming surface 7 of the stationary mold 6 and the cavity forming surface 7 of the movable mold 5. The acrylic printing insert film 4 inserted in the injection mold partly covers the cavity forming surfaces 7. The cavity 13 may be one which forms holes in the molded resin product 11. The recessed portion forming the cavity 13 may be formed in either the stationary mold 6 or the movable mold 5. The mold may have a clamp member 8 which presses and fixes the acrylic printing insert film 4 by the periphery of the recessed portion. In addition, in FIGS. 2A to 3, the clamp member 8 is provided on the side of the movable mold 5. The clamp member 8 may otherwise be provided in the stationary mold 6.

As described above, it is necessary that the difference in shrinkage rate between the in-mold decorating sheet 4 and the after-solidifying molding resin 10 be 0/1000–8/1000. As a concrete example, the polypropylene molding resin 10 has an after-solidifying shrinkage rate of 4/1000 (four thousandths)–12/1000 (twelve thousandths).

The after-solidifying shrinkage rate in this case refers to a ratio of shrinkage of the molded resin product 11 which occurs within 24 hours after the molded resin product 11 that has been formed by injection of the polypropylene molding resin 10 and thereafter set thereof is removed from the injection mold.

Figure 30A:
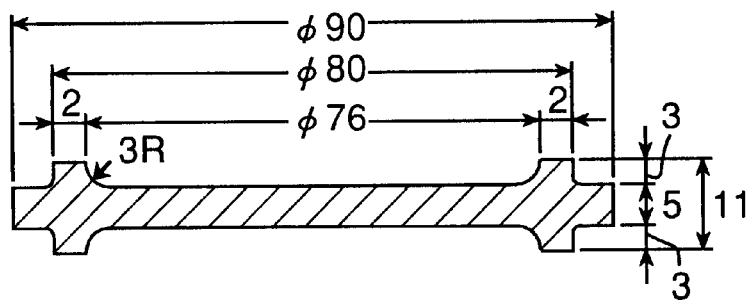
FIGS. 30A, 30B are a sectional view and a plan view, respectively, of a test specimen prepared in compliance with JIS Standard K6911-1979.
Figure 30B:
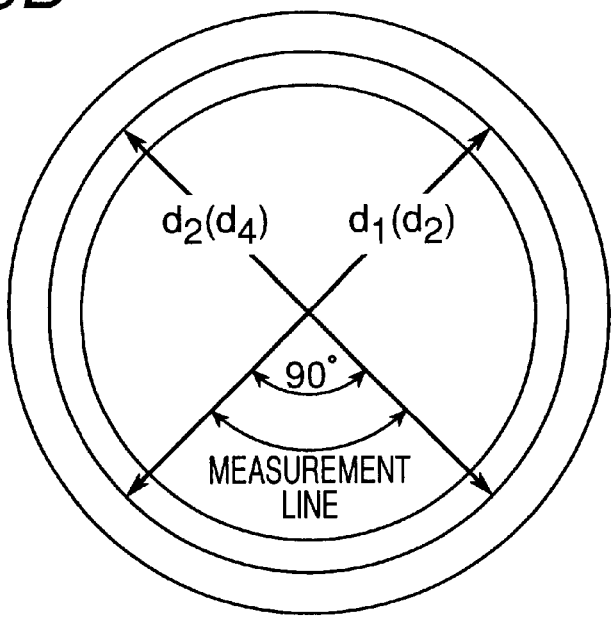

More specifically, the shrinkage rate is a ratio of shrinkage of the molded resin product 11 which occurs within 24 hours after the removal of the molded resin product 11 from the injection mold in the case where a test specimen prepared in compliance with JIS K 6911-1979, i.e., a test specimen as shown in FIGS. 30A and 30B (where the unit of numerical values in the figures is mm) is molded, the shrinkage rate being a value calculated by the following equation. That is, with measurement of measurement lines ($d_1$, $d_2$ for front side and $d_3$, $d_4$ for rear side) perpendicularly to each other on outer diameters of ring-shaped zones protruding on the front and rear of the molded resin product 11 in an elapse of 24 hours after the resin molding as well as measurement of outer diameters (from $D_1$ to $D_4$) of recesses of the mold (room temperature) corresponding to those measurement lines, the shrinkage rate is a value calculated by the following equation:

$$\text{shrinkage rate } (\%) = \frac{1}{4}\left(\frac{D_1-d_1}{D_1} + \frac{D_2-d_2}{D_2} + \frac{D_3-d_3}{D_3} + \frac{D_4-d_4}{D_4}\right) \times 100$$

The polypropylene molding resin 10 may be one mixed with a filler material and rubber-series resin.

The purpose of mixing the filler material into the ipolypropylene molding resin 10 is to reduce the shrinkage rate of the polypropylene molding resin 10 so that the difference in shrinkage rate between the polypropylene molding resin 10 and the acrylic printing insert film 4 is reduced.

Examples of the filler material are talc, calcium carbonate, silica, mica, glass fiber, carbon fiber, and the like. As an example of mixing the filler material, there is a case where the talc of an amount of 10–30 weight percentage is mixed into 100 weight parts of polypropylene resin. In this case, the shrinkage rate of polypropylene resin, which would be 16/1000 without mixture of talc, lowers to about 8–12/1000. In addition, the higher the mixing ratio of the filler material into the polypropylene molding resin 10 is, the lower the shrinkage rate of the polypropylene molding resin 10 becomes. The mixing ratio of the filler material into the polypropylene molding resin 10 is preferably not more than 40 wt %. If the mixing ratio exceeds 40 wt %, the adhesive force between the polypropylene molding resin 10 and the pattern layer 2 or the adhesion layer 3 becomes smaller, causing peel-off more often.

The purpose of mixing the rubber-series resin into the polypropylene molding resin 10 is to increase the adhesive force between the pattern layer 2 or the adhesion layer 3 and the polypropylene molding resin 10 in the case where the resin component of the pattern layer 2 or the adhesion layer 3 brought into contact with the polypropylene molding resin 10 is a chlorinated polypropylene-series resin obtained by modified polypropylene resin. In addition, as compared with the polypropylene molding resin 10 without mixture of rubber-series resin, the polypropylene molding resin 10 mixed with rubber-series resin is relatively higher in capability of holding the flexibility of the molded resin product 11 so as to become larger in adhesive force with the acrylic printing insert film 4, thus effective.

Examples of the rubber-series resin include ethylene propylene rubber (EPM) comprising ethylenic resin and propylene resin, ethylene propylene diene rubber (EPDM) in which the EPM is bridged with diene, chlorosulfonated polyethylene (CSM), chlorinated polyethylene rubber (CM), isobutylene-isoprene rubber (IIR), ethylene-vinyl acetate copolymer resin (EVA), olefinic or styrenic thermoplastic elastomer resin (TPE), and the like. A concrete example of mixing the rubber-series resin is a case where the rubber-series resin of an amount of 0.5–50 wt % is mixed into 100 weight part polypropylene resin. The rubber-series resin is exemplified by olefinic or styrenic thermoplastic elastomer and the like.

Next, the in-mold decorating sheet and the in-mold decorated article according to the third embodiment are further described in detail with reference to the accompanying drawings. It is noted that the arrangement of the injection mold, the method for manufacturing the in-mold decorated article, and appearances of the sheet and the in-mold decorated article in the first embodiment are utterly or generally the same as in the third embodiment, and the first embodiment is explained here in detail along with the description of the third embodiment.

Figure 6:
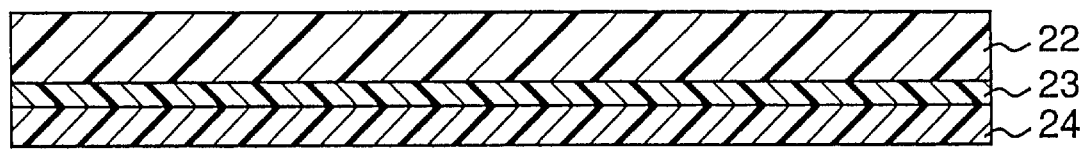
FIG. 6 is an enlarged sectional view showing an insert film which is an in-mold decorating sheet according to a first embodiment or a third embodiment of the present invention.
Figure 12:
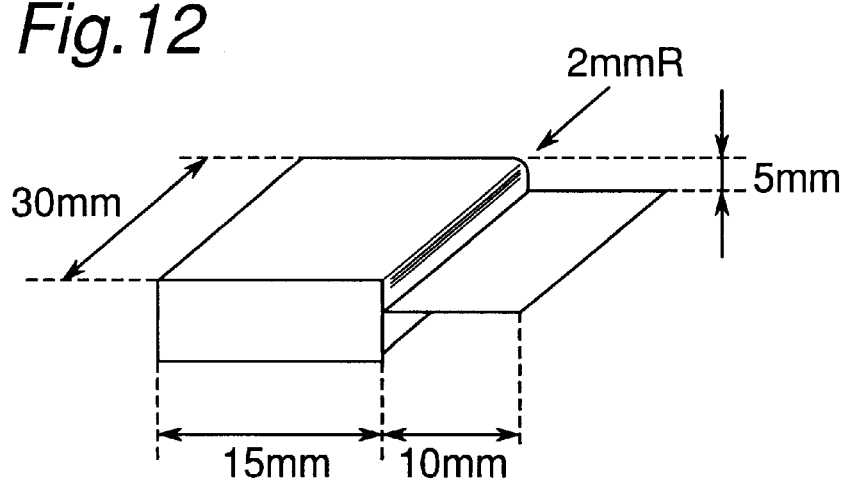
FIG. 12 is a perspective view of an insert-molded article made for investigating the characteristics of the insert film of the third embodiment.
Figure 13:
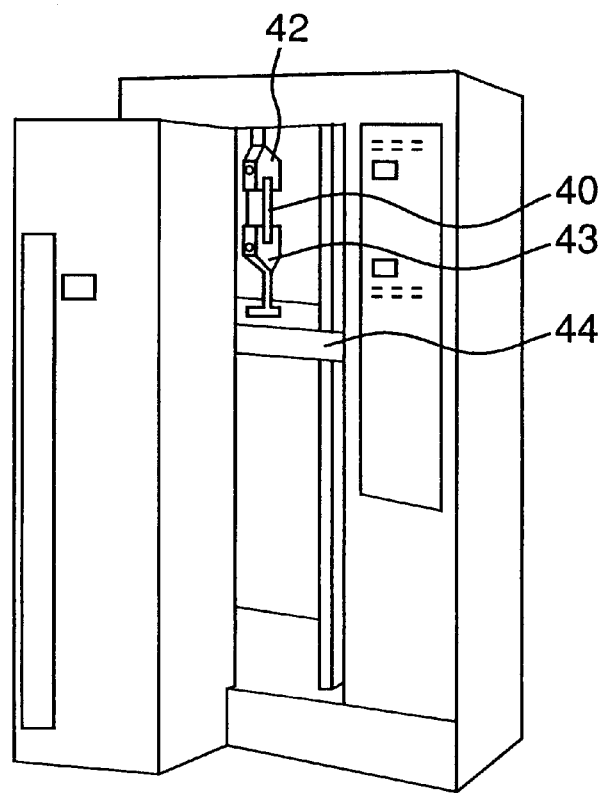
FIG. 13 is a perspective view showing equipment for measuring tensile strength at break and tensile elongation at break of the insert film of the third embodiment.
Figure 14:
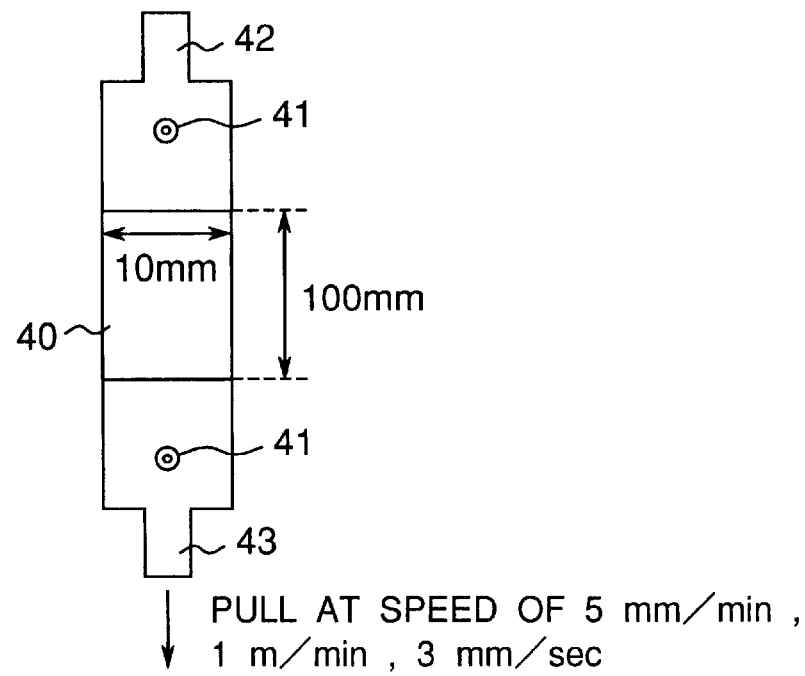
FIG. 14 is a plan view showing a portion for fixing the test specimen in the equipment for measuring tensile strength at break and tensile elongation at break.
Figure 15:
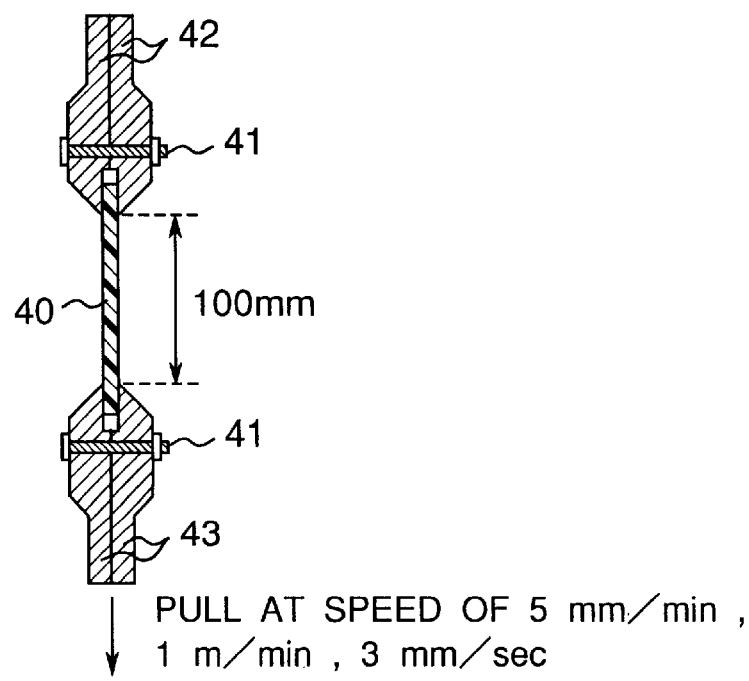
FIG. 15 is a sectional view showing a portion for fixing the test specimen in the equipment for measuring tensile strength at break and tensile elongation at break.
Figure 31A:
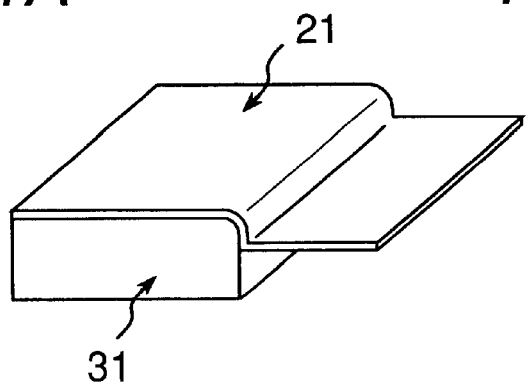
FIGS. 31A, 31B are a perspective view and a side view, respectively, for explaining an in-mold decorated article in the evaluation as to whether a trimming process is easy or not.
Figure 31B:
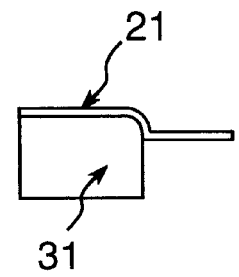

FIG. 6 is an enlarged sectional view showing the in-mold decorating sheet according to the first embodiment. It is note that an enlarged sectional view of the in-mold decorating sheet according to the third embodiment is the same as FIG. 6. FIGS. 7 to 10 are sectional views each showing one process of the method for manufacturing an in-mold decorated article by using the in-mold decorating sheet according to the third embodiment. FIG. 11 is a sectional view showing an in-mold decorated article obtained by using the in-mold decorating sheet according to the third embodiment. FIG. 12 is a perspective view of an in-mold decorated article made for investigating the characteristics of the in-mold decorating sheet according to the third embodiment. That is, FIG. 12 is a perspective view of an in-mold decorated article used in evaluating in-mold decorating sheets of various tensile strengths at break as to whether the in-mold decorating sheets are easy to trim in working into the in-mold decorated article having such a configuration as shown in FIG. 12, with a view to investigating the characteristics of the in-mold decorating sheet according to the third embodiment. More specifically, a later-described test as shown in Table 1was carried out after an in-mold decorating sheet 21 was bonded to the top face of a generally rectangular parallelepiped-shaped molded resin product 31 simultaneously with the molding process as shown in FIGS. 31A and 31B. FIG. 13 is a perspective view showing equipment for measuring tensile strength at break and tensile elongation at break of the in-mold decorating sheet. FIG. 14 is a plan view showing a portion for fixing the test specimen in the equipment for measuring tensile strength at break and tensile elongation at break. FIG. 15 is a sectional view showing the portion for fixing the test specimen in the equipment for measuring tensile strength at break and tensile elongation at break. It is noted that FIGS. 7 to 13 are the same as the individual processes and in-mold decorated articles of -the method for manufacturing the in-mold decorated article by using the in-mold decorating sheet according to the first embodiment, and that FIGS. 14 to 15 are the same as the test equipment for the in-mold decorating sheet according to the first embodiment. Therefore, the following description will be made about the third embodiment except the differences from the first embodiment.

In the figures, reference numeral 21 denotes an in-mold decorating sheet; 22 denotes a base sheet of the in-mold decorating sheet 21; 23 denotes a pattern layer on the base sheet 22; 24 denotes an adhesion layer on the pattern layer 23; 25 denotes a movable mold of an injection mold; 26 denotes a stationary mold composing the injection mold in combination with the movable mold 25; 27 denotes cavity forming surface of the movable mold 25 and the stationary mold 26; 28 denotes a pair of upper and lower rod-like clamp members for fixing the in-mold decorating sheet 21 to the surface of the movable mold 25; 29 denotes a gate portion of the stationary mold 26; 30 denotes a molding resin to be injected into the cavity; 31 denotes a molded resin product formed by the molding resin 30; 32 denotes a vacuum suction hole of the movable mold 25; 33 denotes a cavity formed by the movable mold 25 and the stationary mold 26; 40 denotes a test specimen of the in-mold decorating sheet 21; 41 denotes a screw; 42 denotes a chuck; 43 denotes a chuck; and 44 denotes a movable member.

The in-mold decorating sheet 21 has such a tensile strength at break that when a tensile test is carried out with a 10 mm wide test specimen 40 of the in-mold decorating sheet 21 fixed between an upper-and-lower pair of chucks 42, 43 with a chuck-to-chuck distance of 100 mm, by applying a load at a constant speed of 5 mm/sec to the test specimen 40 at one end thereof under an ambient temperature condition of 25° C. as shown in FIGS. 13 to 15, the test specimen exhibits a tensile strength at break of 0.2–2 kgf.

This constitution of the in-mold decorating sheet 21 makes it possible that the in-mold decorating sheet 21 has such a strength as not to break during the processes carried out until the in-mold decorating sheet 21 is integrated with the molding resin 30, and moreover such a low strength as to be easy to trim after the integration.

Figure 28:
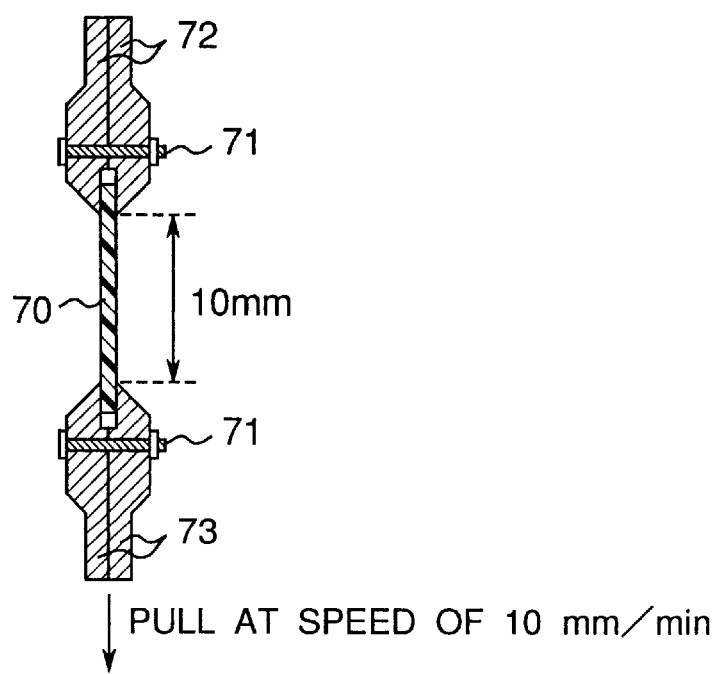
FIG. 28 is a sectional view showing a portion for fixing the test specimen in the equipment for applying a load to the test specimen of the in-mold decorating sheet of the fourth embodiment of the present invention.
Figure 32:
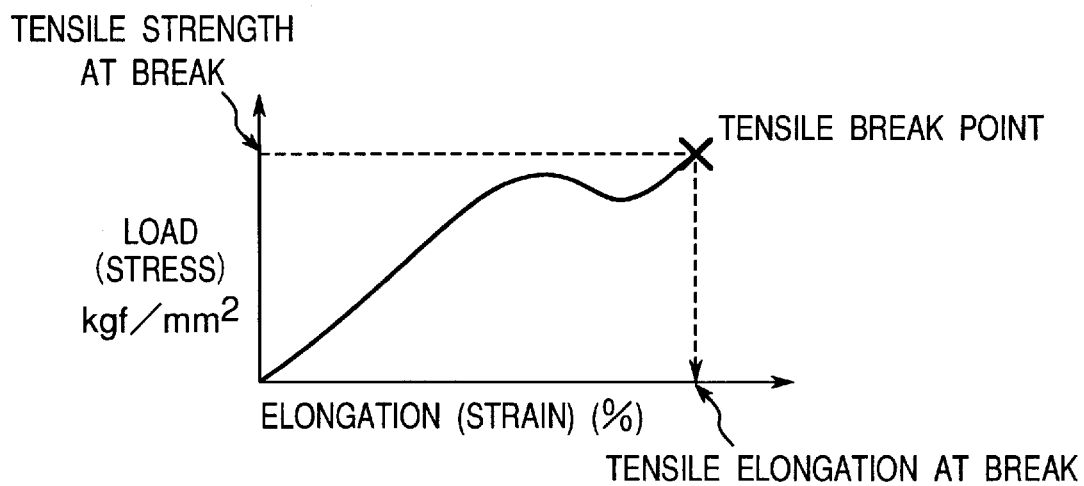
FIG. 32 is a graph showing a relationship between stress (load) and strain (elongation)

A tensile test method conforming to the Japanese Industrial Standards (JIS) K 7127-1989 is selected as a measuring method for verifying that the in-mold decorating sheet 21 itself, in terms of its mechanical characteristics, has such a strength as not to break during the processes carried out until the in-mold decorating sheet 21 is integrated with the molding resin 30, and moreover such a low strength as to be easy to trim after the integration, and it is considered what ambient temperature and appropriate range should be set. The method of JIS K 7127-1989 is a tensile test method, corresponding to the international standardization ISO-1184-1983. In this case, the test involved is to examine mechanical characteristics of the in-mold decorating sheet itself by pulling both ends of the in-mold decorating sheet as shown in FIG. 28, unlike peel strength. By pulling both ends of a test specimen as shown in FIG. 28, a curve showing the relationship between stress (load) and strain (elongation) as shown in FIG. 32 is obtained, by which a tensile strength at break and a tensile elongation at break are obtained.

It is noted here that the ambient temperature refers to a temperature of the atmosphere in which the test specimen 40 is actually tested. The ambient temperature of 25° C. is adopted because the temperature of the atmosphere for the trimming work or other processes carried out until the in-mold decorating sheet 21 is fed into the mold is basically room temperature.

Also, the speed of 5 mm/sec for pulling the test specimen 40 is set by adopting a speed at which a worker in actual operation pulls the in-mold decorating sheet 21 by hand work to do trimming because trimming by human hand involves pulling the in-mold decorating sheet 21 more strongly than in the case where a laser beam or punching die is used.

Also, the test specimen 40 is prepared by cutting the in-mold decorating sheet 21 into a 10 mm wide size which allows the test specimen to lend itself to the tensile test in which the distance between a pair of chucks is 100 mm. The 10 mm width of the test specimen 40 is adopted because the peel strength between the in-mold decorating sheet 21 and the molded resin product 31 is generally determined at the width of 10 mm, and because the peel strength test and the trimming are similar in work to each other. Further, the 100 mm chuck-to-chuck distance is adopted because such a large size of the in-mold decorating sheet 21 that the in-mold decorating sheet 21 is larger than the molded resin product at an end portion of the molded resin product by about 100 mm is the most workable and practical for trimming by hand work. In addition, in FIGS. 13 to 15, the upper-of-the-pair chuck 42 is fixed by the screw 41 with an upper end of the test specimen 40 pinched by the chuck 42. Also, the lower-of-the-pair chuck 43 is fixed by the screw 41 with a lower end of the test specimen 40 pinched by the chuck 43. As shown in FIG. 13, the upper-of-the-pair chuck 42 is fixed to the test equipment, while the lower-of-the-pair chuck 43 is lowered at a speed of 5 mm/sec downward by the movable member 44 to exert a tensile force on the test specimen 40.

The tensile strength at break in this case refers to a tensile strength at break, i.e. a strength at which the test specimen 40 breaks, which is obtained when a tensile test is carried out with a 10 mm wide test specimen 40 of the in-mold decorating sheet 21 fixed between a pair of chucks with a chuck-to-chuck distance of 100 mm, by applying a load at a constant speed of 5 mm/sec to the test specimen 40 at one end thereof under an ambient temperature condition of 25° C. In order that the in-mold decorating sheet 21 breaks before reaching the peel strength value of the first embodiment so that there occurs neither fault in trimming work nor peeling of the in-mold decorating sheet 21 from the molded resin product 31 during the trimming work, the tensile strength at break must be within a range of 0.2–2 kgf. If the tensile strength at break is less than 0.2 kgf, the possibility that the in-mold decorating sheet 21 may be damaged during the processes until the in-mold decorating sheet 21 is fed to the mold becomes higher. Also, if the tensile strength at break is higher than 2 kgf, the in-mold decorating sheet 21 is difficult to trim, and in some cases the in-mold decorating sheet 21 that has bonded to the molded resin product 31 may be peeled off.

Also, the in-mold decorating sheet 21 has at least a pattern layer 23 formed on the base sheet 22 as shown in FIG. 6, and may be made up so as to have a tensile strength at break of 30 gf or more when a tensile test is carried out with a 10 mm wide test specimen 40 of the base sheet 22 fixed between a pair of chucks with a chuck-to-chuck distance of 100 mm, by applying a load at a constant speed of 1 m/min to the test specimen 40 at one end thereof under an ambient temperature condition of 40° C. With this constitution, the base sheet 22 before the in-mold decorating sheet 21 is manufactured is enabled to have such a strength as to form the pattern layer 23.

As the base sheet 22, usable are thermoplastic resin sheets composed of acrylic resin, vinyl chloride resin, light-fast olefinic resin, nylon resin, fluoric resin, polyethylene terephthalate resin, polyurethane resin, polycarbonate resin, ethylene vinyl alcohol resin, polystyrene resin, polybutylene terephthalate resin, or the like having durability and three-dimensional working suitability.

The thickness of the base sheet 22 is preferably 30–800 $\mu$m. If the thickness is less than 30 $\mu$m, the base sheet 22 becomes more liable to wrinkle, making it difficult to print the pattern layer 23. If the thickness is more than 800 $\mu$m, the base sheet 22 becomes hard to roll, resulting in deteriorated productivity. More preferably, the thickness of the base sheet is 50–200 $\mu$m. If the base sheet 22 is rather thin like this range of 50–200 $\mu$m, then the base sheet 22 can be wound at a larger length per roll so that the production efficiency increases.

The in-mold decorating sheet 21 may be provided with the pattern layer 23. The pattern layer 23 is provided on the base sheet 22. The pattern layer 23 is purposed to express characters, graphics, symbols, or the like on the surface of the molded resin product 31, or express a colored surface. Also, the pattern layer 23 may be of a single color without patterns all over such as black and silver metallic color, or of a single color or multiple colors with a pattern such as a wood grain pattern or a stone grain pattern. Otherwise, the pattern layer 23 may express an all-over golden-color layer or a pattern layer by laminating the all-over transparent yellow layer or the pattern layer and an all-over silver metallic color layer or a pattern layer together. The pattern layer 23 comprises at least one layer selected from a group consisting of a pigment/ink layer composed of pigment and resin binder, a glitter pigment layer composed of pearl pigment and resin binder, and a dye/ink layer composed of dye and resin binder. Such a pattern layer 23 may be formed by an ordinary printing process such as offset printing, gravure printing, or screen printing, or a coating process such as roll coating or spray coating. The thickness of the pattern layer 23 is preferably 0.1–20 $\mu$m. With an ordinary printing process, the thickness falls within this range.

Also, the pattern layer 23 may be composed of a metal thin film layer, or a combination of a metal thin film layer and a print layer. The metal thin film layer is formed by a vacuum deposition process, a sputtering process, an ion plating process, a plating process, or the like. Depending on the metallic luster color that is desired, metals such as aluminum, nickel, gold, platinum, chromium, iron, copper, tin, indium, silver, titanium, lead, or zinc, or alloys or compounds of these metals are used.

Figure 29:
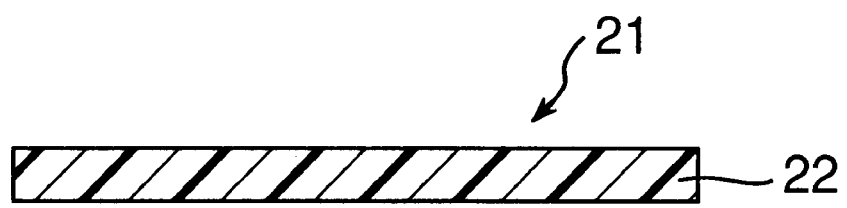
FIG. 29 is an enlarged sectional view showing an insert film which is an in-mold decorating sheet according to a modification of the first or third embodiment of the present invention.

Further, in the first embodiment or the third embodiment, it is also possible to provide an in-mold decorating sheet which fulfills decoration by the color of the base sheet 22 itself without providing the pattern layer 23, as shown in FIG. 29.

In this case, the ambient temperature of 40° C. is adopted because the pattern layer 23, after its formation, needs to be passed through a drying oven of about 40–100° C. for the purpose of drying by spattering the solvent contained in the ink, in which process the in-mold decorating sheet 21 is exposed to an atmosphere of at least 40° C., which lowest value of temperature is adopted.

The tensile strength at break in this case refers to a tensile strength at break, i.e. a strength at which the test specimen 40 breaks, which is obtained when a tensile test is carried out with a 10 mm wide test specimen 40 of the base sheet 22 fixed between a pair of chucks with a chuck-to-chuck distance of 100 mm, by applying a load at a constant speed of 1 m/min to the test specimen 40 at one end thereof under an ambient temperature condition of 40° C. The tensile strength at break is preferably not less than 30 gf. This is because in forming the pattern layer 23, applied to the base sheet 22 is a tensile strength of at least 3 kgf or more, more specifically, about 7–15 kgf for gravure printing machines, about 5–10 kgf for screen printing machines, about 3–10 kgf for roll coaters, about 3–12 kgf for reverse coaters, and the like. Normally, the width of the print sheet is 1000±500 mm, and the load of 3 kgf for the 1000 mm wide sheet corresponds to a load of 30 gf applied for a width of 10 mm.

Also, the speed of 1 m/min at which the test specimen 40 is pulled is based on the test speed of JIS K7127.

The setting that the tensile strength at break is 0.2–2 kgf when a tensile test is carried out with a test specimen 40 of the in-mold decorating sheet 21 by applying a load at a constant speed of 5 mm/sec to the test specimen 40 at one end thereof under an ambient temperature condition of 25° C., and the setting that the tensile strength at break is not less than 30 gf when a tensile test is carried out with a test specimen 40 of the base sheet 22 by applying a load at a constant speed of 1 m/min to the test specimen 40 at one end thereof under an ambient temperature condition of 40° C. are contradictory to each other, the former showing that the in-mold decorating sheet 21 has such a strength as to be easy to trim without breaking during the processes carried out until the in-mold decorating sheet 21 is integrated with the molding resin 30, and the latter showing that the base sheet 22 before the in-mold decorating sheet 21 is manufactured has such a strength as to be able to form the pattern layer 23. In order to satisfy these two properties, it is appropriate to select a base sheet 22 which has a more than specific strength before the formation of the pattern layer 23 and which has a characteristic that the strength moderately lowers after the formation of the pattern layer 23.

As the base sheet 22 having such a characteristic, available are an acrylic film having a thickness of 50–200 $\mu$m (preferably, 50–100 $\mu$m thick), a polycarbonate film having a thickness of 30–150 $\mu$m (preferably, 30–80 thick), both of which are capable of being affected by the organic solvent contained in the print ink constituting the pattern layer 23, a polyvinyl alcohol film having a thickness of 50–800 $\mu$m (preferably, 80–300 $\mu$m thick) capable of being affected by water or alcohol, and the like.

Also, the in-mold decorating sheet 21 may be one which exhibits a tensile elongation at break of not less than 150% when a tensile test is carried out with a 10 mm wide test specimen 40 of the in-mold decorating sheet 21 fixed between a pair of chucks with a chuck-to-chuck distance of 100 mm, by applying a load at a constant speed of 3 mm/sec to the test specimen 40 at one end thereof under an ambient temperature condition of 110° C. With this constitution of the in-mold decorating sheet 21, the in-mold decorating sheet 21 is enabled to have such an elongation as to be workable into a desired configuration.

The setting of the ambient temperature of 110° C. is due to the fact that vacuum molding is generally used for three-dimensional working, in which case the in-mold decorating sheet 21 is heated to 110–200° C. for molding, the lowest value 110° C. of which is adopted. The lower the temperature at which the molding is done is, the less the in-mold decorating sheet 21 is adversely affected.

Also, the setting of the speed of 3 mm/sec at which the test specimen 40 is pulled is due to the fact that the vacuum molding is generally used for three-dimensional working, the lowest speed at which the sheet is elongated during the process is measured and adopted.

The tensile elongation at break in this case refers to an elongation at break, i.e. an elongation at which the test specimen 40 breaks, which is obtained when a tensile test is carried out with a 10 mm wide test specimen 40 of the in-mold decorating sheet 21 fixed between a pair of chucks with a chuck-to-chuck distance of 100 mm, by applying a load at a constant speed of 3 mm/sec to the test specimen 40 at one end thereof under an ambient temperature condition of 110° C. The tensile elongation at break is preferably not less than 150%. If the tensile elongation at break is less than 150%, the in-mold decorating sheet 21 cannot be worked into a configuration of the in-mold decorated article as shown in FIG. 12. Since such a configuration is by no means a special configuration of deep drawing, the incapability of such a level of working would cause the in-mold decorating sheet 21 to be extremely narrow in application range of products.

Evaluation results on trimming ease of various types of base sheets 22 under the above-mentioned individual conditions are shown in Table 1. Symbols in evaluation results denote excellent by ⊚, good by O, fair by Δ, and poor by x, respectively.

Figure 33A:
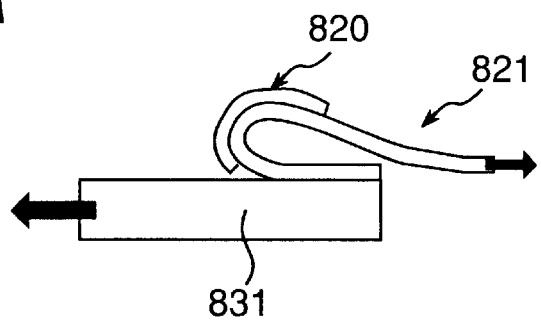
FIGS. 33A, 33B are a side view and a perspective view, respectively, for explaining the peel strength test.
Figure 33B:
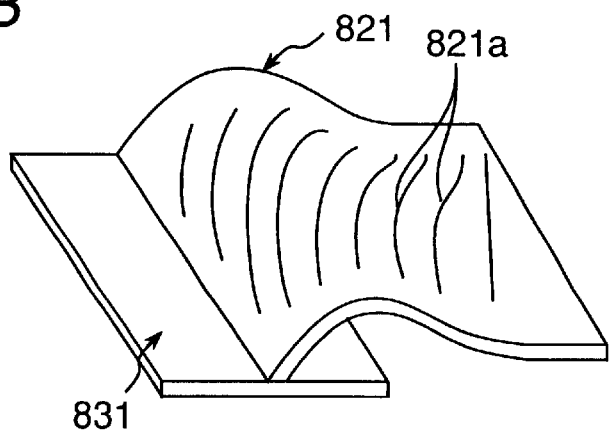

Meanwhile, in the in-mold decorating sheet according to the first embodiment, it is necessary for the in-mold decorating sheet to be in strong adhesion with the molding resin, and a peel strength test was carried out as to what adhesive force is necessary. That is, a non-adhesive layer 820 which does not adhere to a molding resin molding plate 831 is previously formed in a portion of an in-mold decorating sheet 821 as shown in FIGS. 33A and 33B, and the in-mold decorating sheet 821 to be worked for in-mold decoration is folded 180° so as not to be damaged as shown in FIGS. 33A and 33B, in which state the peel strength test is carried out by pulling two ends (the molding resin molding plate 831 and the in-mold decorating sheet 821) toward the directions of arrows. In a test specimen of the in-mold decorating sheet, two parallel slits 821a which reach the molding resin plate are formed at a 1 inch spacing with a sharp edge, and a maximum load necessary to peel off the in-mold decorating sheet 821 from the molding resin surface is measured. The measurement value is divided by the parallel-line spacing (1 inch), and the division result is taken as the peel strength. As a result of this, if a peel strength value of at least not less than 1 kgf/inch width results when an unnecessary portion of the in-mold decorating sheet is peeled off from an interface with the molding resin, i.e. from the surface of the molding-resin molded article in compliance with conditions of JIS K K6744-1992 or ASTM D903, there occurs neither faults of trimming work nor peeling of the in-mold decorating sheet from the molded resin product during the trimming process. Consequently, it was found that a strength of less than 1 kgf/inch width would cause the yield rate to lower to a large extent during the processes carried out until the product is obtained such that the productivity is problematic (see Tables 2 to 5). However, if the in-mold decorating sheet breaks before reaching this peel strength value, there occurs no lowering of the yield rate so that the productivity is no problem (see Tables 2 to 5).

TABLE 1

| Type of base sheet | Thickness of base sheet (mm) | Tensile strength at break (kgf) Base sheet alone | Tensile strength at break (kgf) In-mold decorating sheet | Tensile elongation at break (%) | Behavior in trimming | Evaluation result |
|---|---|---|---|---|---|---|
| Acrylic film | 0.050 | 0.8 | 0.3 | 180 | Good | ⊚ |
|  | 0.075 | 0.16 | 0.6 | 190 | Good | ⊚ |
|  | 0.100 | 0.21 | 0.8 | 195 | Good | ⊚ |
|  | 0.125 | 0.225 | 1.1 | 200 | Good | O |
|  | 0.150 | 0.25 | 1.2 | 210 | Good | O |
|  | 0.175 | 0.31 | 1.6 | 210 | Good | O |
|  | 0.200 | 0.37 | 1.9 | 220 | Good | Δ |
|  | 0.250 | 0.44 | 2.2 | 225 | Hard to trim | x |
|  | 0.300 | 0.52 | 2.9 | 225 | Hard to trim | x |
|  | 0.400 | 0.71 | 45 | 230 | Hard to trim | x |
| Polycarbonate | 0.03 | 0.85 | 0.4 | 160 | Good | ⊚ |
|  | 0.05 | 0.97 | 0.7 | 165 | Good | ⊚ |
|  | 0.08 | 1.2 | 1.0 | 165 | Good | ⊚ |
|  | 0.1 | 1.3 | 1.8 | 165 | Good | O |
|  | 0.15 | 1.4 | 2.0 | 165 | Good | Δ |
|  | 0.18 | 1.4 | 2.7 | 165 | Hard to trim | x |
|  | 0.25 | 1.4 | 3.3 | 165 | Hard to trim | x |
| Polyvinyl alcohol | 0.03 | 0.77 | 0.18 | 145 | Break during printing | x |
|  | 0.05 | 1.1 | 0.20 | 150 | Good | O |
|  | 0.08 | 1.3 | 0.22 | 155 | Good | ⊚ |
|  | 0.15 | 1.8 | 0.23 | 155 | Good | ⊚ |
|  | 0.3 | 3.5 | 0.58 | 160 | Good | ⊚ |
|  | 0.8 | 10 | 1.8 | 180 | Good | Δ |
|  | 1.0 | 13 | 2.1 | 185 | Hard to trim | x |

Here are shown relationships between the adhesion (peel strength) of in-mold decorating sheets to the molding resin and the yield rate of products in Tables 2 to 5 below:

TABLE 2

When a 125 μm acrylic printing film is used as the in-mold decorating sheet and polypropylene is used as the molding resin

| Sample No. | Product yield (%) | Peel strength (kgf/inch) | Adhesive resin for in-mold decorating sheet |
|---|---|---|---|
| 1 | 4 | 0.34 | Vinyl chloride/chlorinated polypropylene |
| 2 | 25 | 0.53 | Vinyl chloride/chlorinated polypropylene |
| 3 | 31 | 0.72 | Chlorinated polypropylene |
| 4 | 70 | 0.98 | Chlorinated polypropylene |
| 5 | 88 | 1.18 | Chlorinated polypropylene |
| 6 | 94 | 1.35 | Chlorinated polypropylene |
| 7 | 94 | 1.49 | Chlorinated polypropylene |
| 8 | 87 | 0.48 (Break halfway) | Vinyl chloride/chlorinated polypropylene |
| 9 | 85 | 0.32 (Break halfway) | Vinyl chloride/chlorinated polypropylene |
| 10 | 85 | 0.42 (Break halfway) | Chlorinated polypropylene |
| 11 | 83 | 0.44 (Break halfway) | Chlorinated polypropylene |

TABLE 3

When an 80 μm polycarbonate printing film is used as the in-mold decorating sheet and polycarbonate is used as the molding resin

| Sample No. | Product yield (%) | Peel strength (kgf/inch) | Adhesive resin for in-mold decorating sheet |
|---|---|---|---|
| 1 | 44 | 0.72 | Vinyl chloride |
| 2 | 60 | 0.88 | Vinyl chloride |
| 3 | 77 | 0.92 | Vinyl chloride |
| 4 | 92 | 1.11 | Vinyl chloride |
| 5 | 94 | 1.69 | Vinyl chloride |
| 6 | 86 | 0.68 (Break halfway) | Vinyl chloride |
| 7 | 80 | 0.52 (Break halfway) | Vinyl chloride |

TABLE 4

When a 200 μm acrylic printing film is used as the in-mold decorating sheet and acrylonitrile butadiene-styrene resin is used as the molding resin

| Sample No. | Product yield (%) | Peel strength (kgf/inch) | Adhesive resin for in-mold decorating sheet |
|---|---|---|---|
| 1 | 26 | 0.72 | Vinyl chloride |
| 2 | 61 | 0.88 | Vinyl chloride |
| 3 | 80 | 0.92 | Vinyl chloride |
| 4 | 94 | 1.25 | Vinyl chloride |
| 5 | 94 | 1.49 | Vinyl chloride |
| 6 | 96 | 0.88 (Break halfway) | Vinyl chloride |
| 7 | 88 | 0.62 (Break halfway) | Vinyl chloride |

TABLE 5

When a 300 μm polyvinyl alcohol film is used as the in-mold decorating sheet and polylactic acid is used as the molding resin

| Sample No. | Product yield (%) | Peel strength (kgf/inch) | Adhesive resin for in-mold decorating sheet |
|---|---|---|---|
| 1 | 70 | 0.78 | Acrylic |
| 2 | 78 | 0.88 | Acrylic |
| 3 | 86 | 1.02 | Acrylic |
| 4 | 94 | 1.29 | Acrylic |
| 5 | 96 | 0.68 (Break halfway) | Acrylic |
| 6 | 94 | 0.42 (Break halfway) | Acrylic |

Next, the methid for manufacturing the in-mold decorating article is described.

Figure 7:
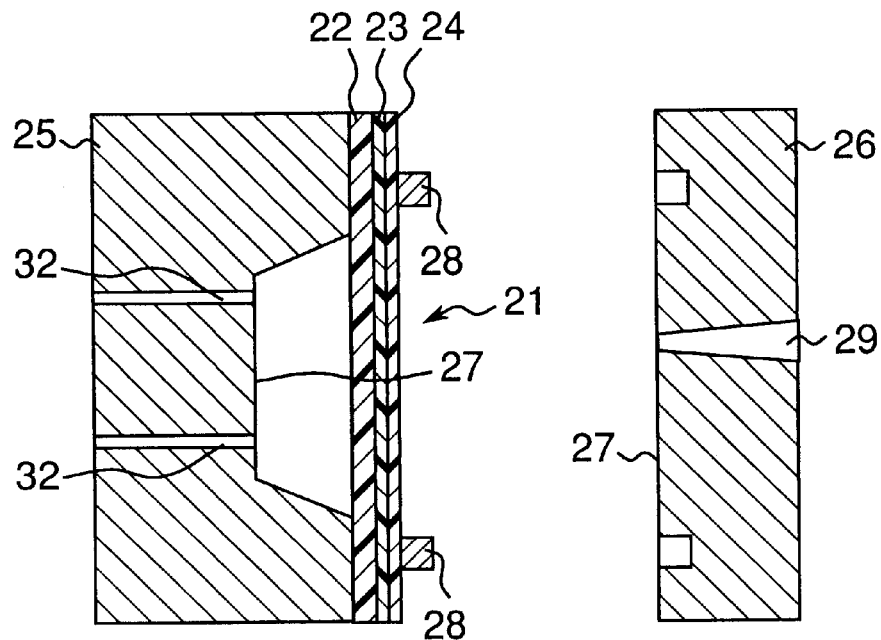
FIG. 7 is a sectional view showing one process of the method for manufacturing an insert-molded article with the insert film of the third embodiment.

First, as shown in FIG. 7, the in-mold painting sheet 21 is set onto the surface of the movable mold 25 which is an injection mold, and fixed by an upper-and-lower pair of rod-like clamp members 28 or the like. The injection mold may be, for example, the injection mold as shown in FIG. 2A as described before.

A concrete example of the way of setting the in-mold decorating sheet 21 in the case of an injection mold is as follows. An in-mold decorating sheet 21 of long size is wound on a roll shaft into a roll form once, and this roll form sheet is placed on a top portion of the movable mold integrally movably with the movable mold 25. While being paid out from the roll form winding, the in-mold decorating sheet 21 is allowed to pass through the space between the shunted movable mold 25 and the stationary mold 26, by which the in-mold decorating sheet 21 is set to the movable mold 25. In this case, after the use of the in-mold decorating sheet 21, the in-mold decorating sheet 21 may be wound up by the roll shaft of film winding means installed below the movable mold 25 for a molding process integrally movable with the movable mold 25. As another example in case of an injection mold, with the use of the in-mold decorating sheet 21 in a leaf form, the in-mold decorating sheet 21 may be set to the movable mold 5 by a robot or human hand. In this case, for the setting of the in-mold decorating sheet 21 to the surface of the movable mold 25, after the in-mold decorating sheet 21 is set to the surface of the movable mold 25, the position of the in-mold decorating sheet 21 relative to the surface of the movable mold 25 is determined by a positioning sensor or the like, where the in-mold decorating sheet 21 may appropriately be pressed against the surface of the movable injection mold 25 with the clamp member 28.

Then, as shown in FIG. 8, after the in-mold decorating sheet 21 is fixed to the movable mold 25 of the injection mold, the in-mold decorating sheet 21 is worked into a three-dimensional shape.

A concrete example of the method for working into the three-dimensional shape is as follows. In the case of an injection mold, the in-mold decorating sheet 21 fixed onto the surface of the movable mold 25 is heated to a temperature equal to or higher than the softening point to become softened by means of a heating plate or the like inserted between the movable mold 25 and the stationary mold 26, the space between the recessed portion of the movable mold 25 for the injection molding and the in-mold decorating sheet 21 is closed, and vacuum suction is carried out by evacuating the space through the plural vacuum suction holes 32 to cause the in-mold decorating sheet 21 to closely adhere to the interior surface (cavity forming surface 27) of the recessed portion of the movable mold 25 for the injection molding. In three-dimensional working, or in pressing and fixing the in-mold decorating sheet 21 with the clamp member 28, an unnecessary portion of the in-mold decorating sheet 21 may be punched out.

Alternatively, before the in-mold decorating sheet 21 is set on the movable mold 25, the in-mold decorating sheet 21 may be previously three-dimensionally worked into a desired shape by using a separate three-dimensional working mold different from the movable mold 25 and the stationary mold 26 for injection molding. As the method for previously three-dimensionally working the in-mold decorating sheet 21, there are a vacuum molding method, a pressure forming method, a pressing and molding method in which heated rubber is pressed against an object, a press molding method, and the like. A vacuum molding method is such that the in-mold decorating sheet 21 is heated to a temperature equal to or higher than the softening point to become softened, the space between the recessed portion of the vacuum forming mold and the in-mold decorating sheet 21 is tightly closed and vacuum suction is carried out to cause the in-mold decorating sheet 21 to closely adhere to the interior surface of the recessed portion of the vacuum forming mold, whereby the in-mold decorating sheet 21 is formed into a three-dimensional shape conforming to the cavity forming surface 27 of the mold for the molding process.

Figure 9:
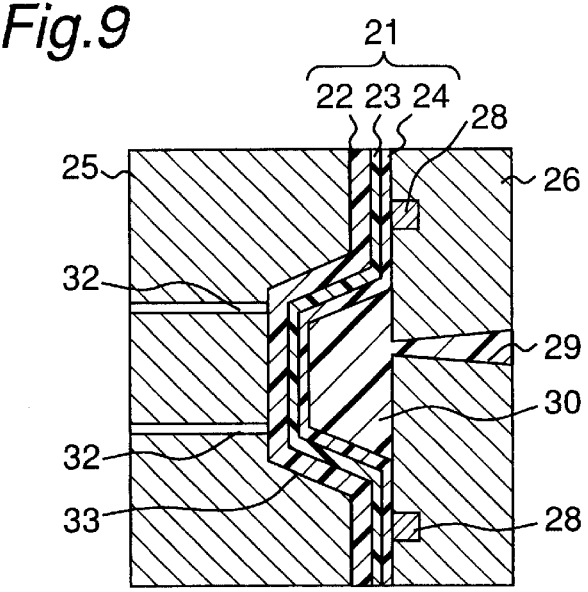
FIG. 9 is a sectional view showing one process of the method for manufacturing the insert-molded article with the insert film of the third embodiment.

Next, as shown in FIG. 9, the movable mold 25 is moved to the stationary mold 26 and the two molds are clamped together. Then, the molding resin 30 in a molten state is injected into the mold, and the injected molding resin 30 is cooled and solidified so that a molded resin product 31 is formed, and simultaneously therewith the in-mold decorating sheet 21 is integrally bonded to the surface of the molded resin product 31.

More specifically, with the use of an injection mold, as shown in FIG. 9, the molding resin 30 is injected into the mold, the molding resin 30 is filled in the mold and the molding resin 30 is formed into a desired shape. Then, the molding resin 30 is solidified so that the molded resin product 31 is formed, and simultaneously therewith the adhesive layer-24-side of the in-mold decorating sheet 21 is integrally bonded to the molded resin product 31.

Figure 10:
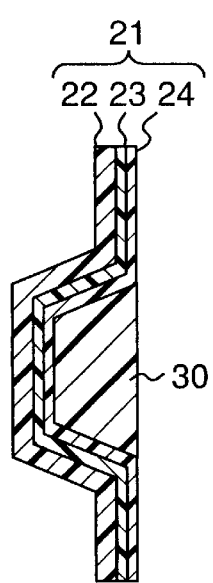
FIG. 10 is a sectional view showing one process of the method for manufacturing the insert-molded article with the insert film of the third embodiment.
Figure 11:
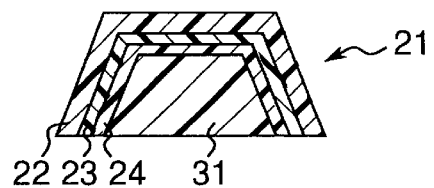
FIG. 11 is a sectional view showing an insert-molded article obtained by using the insert film of the third embodiment.

Thereafter, after the molded resin product 31 is removed from the mold as shown in FIG. 10, an unnecessary portion, for example, an unbonded portion of the in-mold decorating sheet 21 bonded to the molded resin product 31 is removed by trimming as shown in FIG. 11.

The molding resin 30 is not particularly limited. Examples of the molding resin 30 are talc-containing polypropylene resin, modified polypropylene resin, (heat-resistant) acrylonitrile butadiene styrene resin, polycarbonate resin, acrylic resin, polyethylene resin, ethylene-vinyl acetate resin, polybutylene terephthalate resin, polyester resin, or mixtures of these resins.

Next, the in-mold decorating sheet and the in-mold decorated article according to the fourth embodiment are =further described in detail with reference to the accompanying drawings.

Figure 16:
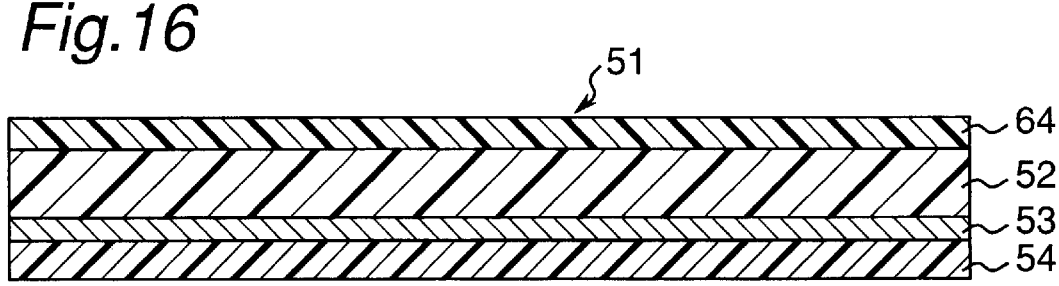
FIG. 16 is a sectional view showing an embodiment of an in-mold decorating sheet according to a fourth embodiment of the present invention.
Figure 17:
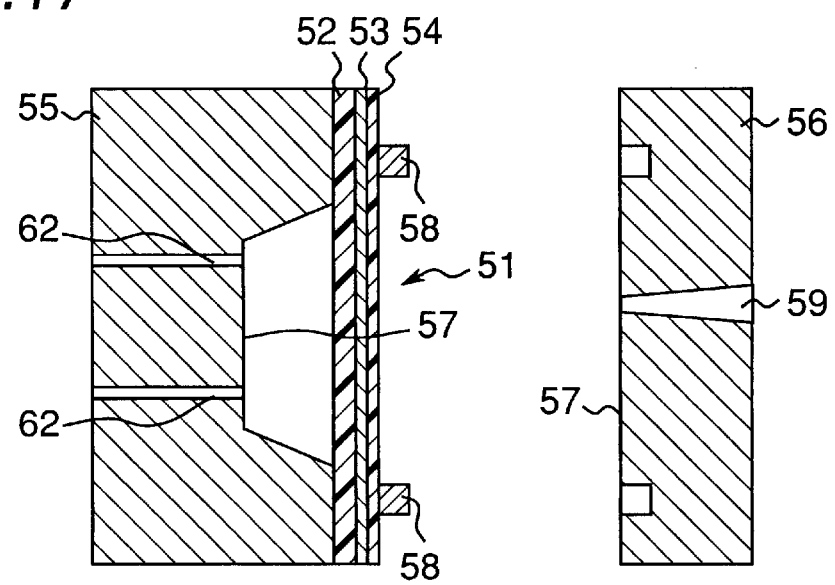
FIG. 17 is a sectional view showing one of the processes of the method for manufacturing an in-mold decorated article including the in-mold decorating sheet of the fourth embodiment of the present invention.
Figure 18:
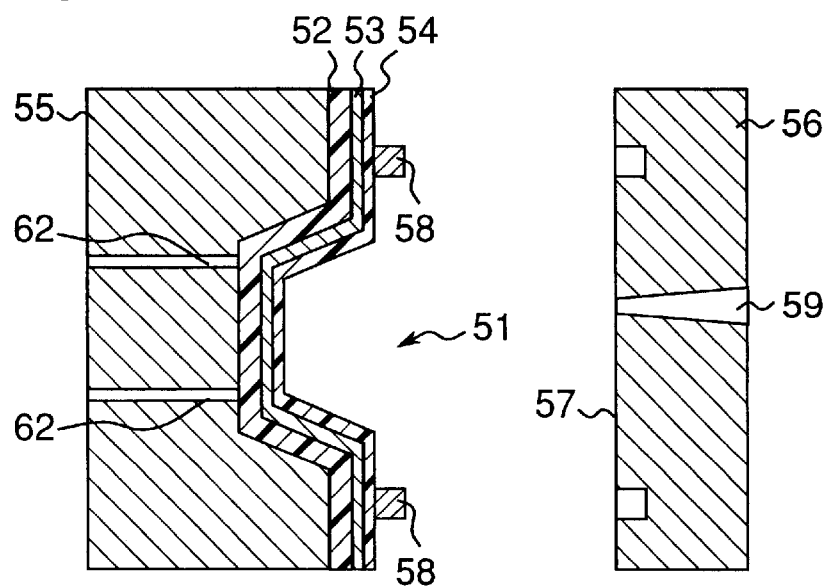
FIG. 18 is a sectional view showing one of the processes of the method for manufacturing the in-mold decorated article including the in-mold decorating sheet of the fourth embodiment of the present invention, subsequent to the process of FIG. 17.
Figure 19:
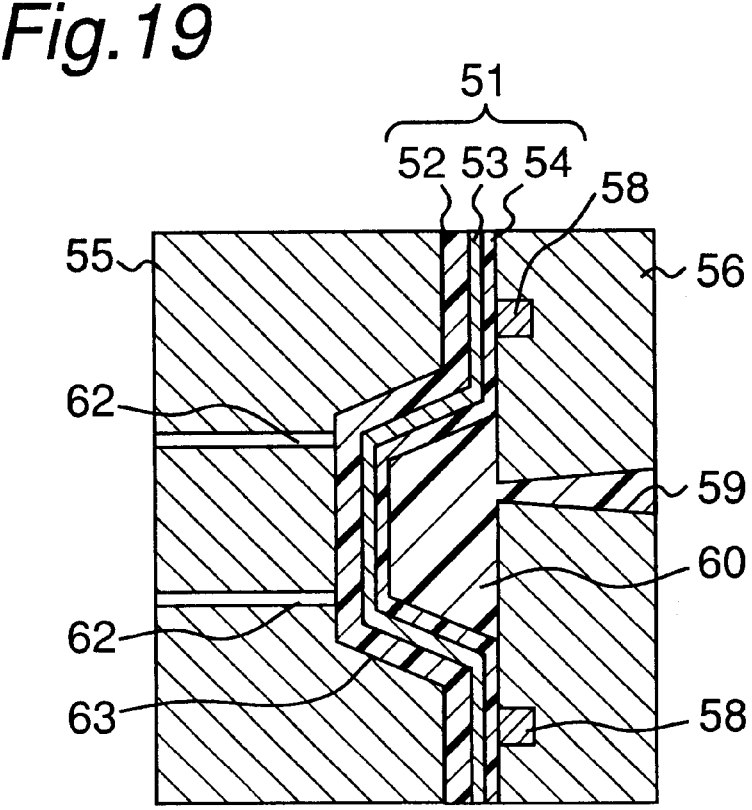
FIG. 19 is a sectional view showing one of the processes of the method for manufacturing the in-mold decorated article including the in-mold decorating sheet of the fourth embodiment of the present invention, subsequent to the process of FIG. 18.
Figure 20:
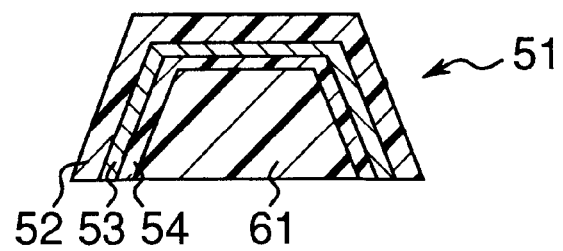
FIG. 20 is a sectional view showing an in-mold decorated article obtained by the method for manufacturing the in-mold decorated article including the in-mold decorating sheet of the fourth embodiment of the present invention.
Figure 21:
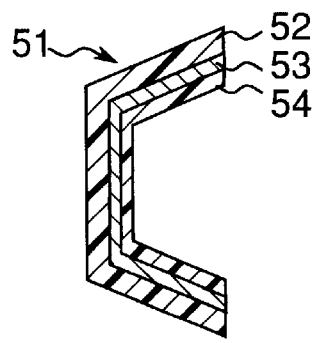
FIG. 21 is a sectional view showing a three-dimensionally worked in-mold decorating sheet to be used in the method for manufacturing the in-mold decorated article including the in-mold decorating sheet of the fourth embodiment of the present invention.
Figure 22:
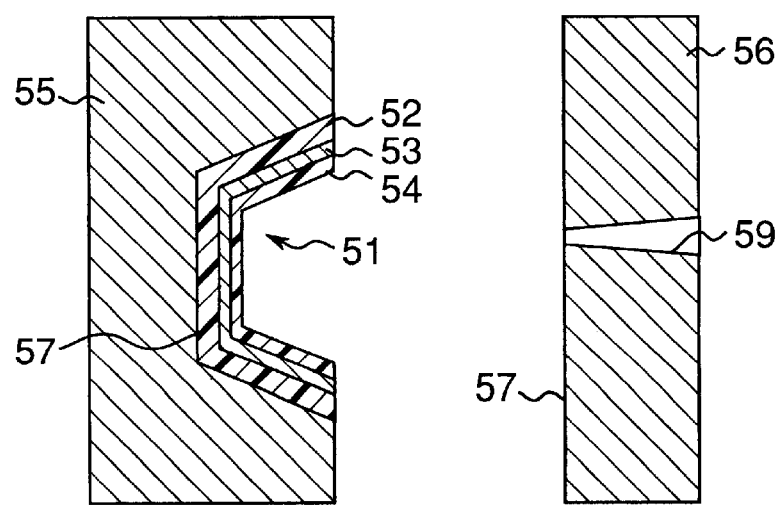
FIG. 22 is a sectional view showing one of the processes of the method for manufacturing the in-mold decorated article including the in-mold decorating sheet of the fourth embodiment of the present invention, subsequent to the process of FIG. 21.
Figure 23:
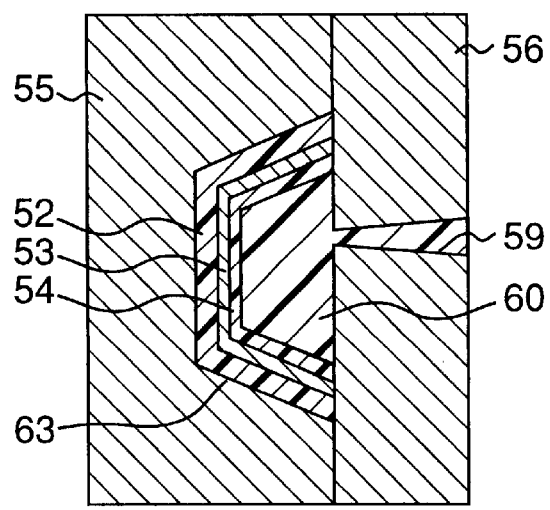
FIG. 23 is a sectional view showing one of the processes of the method for manufacturing the in-mold decorated article including the in-mold decorating sheet of the fourth embodiment of the present invention, subsequent to the process of FIG. 22.
Figure 24:
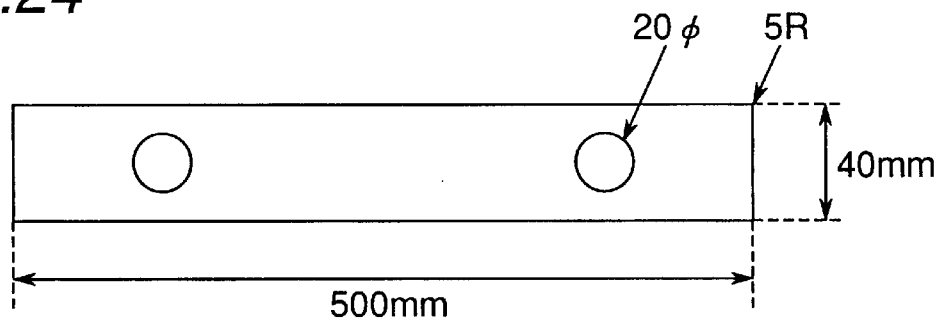
FIG. 24 is a plan view showing a deep-drawn molded resin product shape for evaluation of three-dimensional molding in the method for manufacturing the in-mold decorated article including the in-mold decorating sheet of the fourth embodiment of the present invention.
Figure 25:
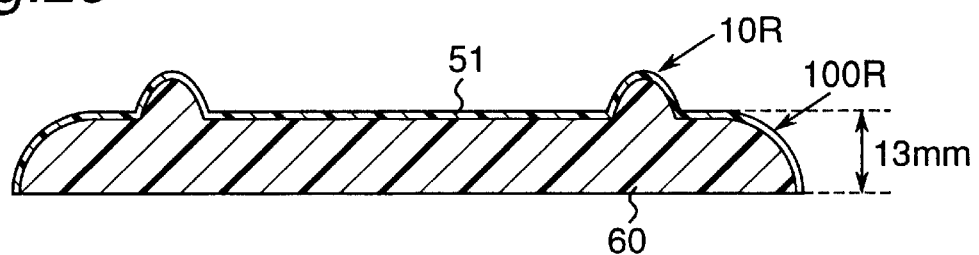
FIG. 25 is a sectional view showing a deep-drawn molded resin product shape for evaluation of three-dimensional molding in the method for manufacturing the in-mold decorated article including the in-mold decorating sheet of the fourth embodiment of the present invention.
Figure 26:
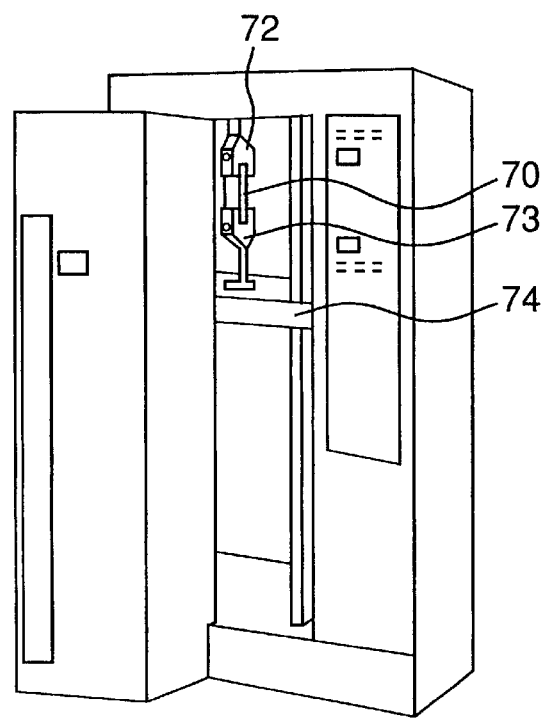
FIG. 26 is a perspective view showing equipment for applying a load to the test specimen of an in-mold decorating sheet in the method for manufacturing the in-mold decorated article including the in-mold decorating sheet of the fourth embodiment of the present invention.
Figure 27:
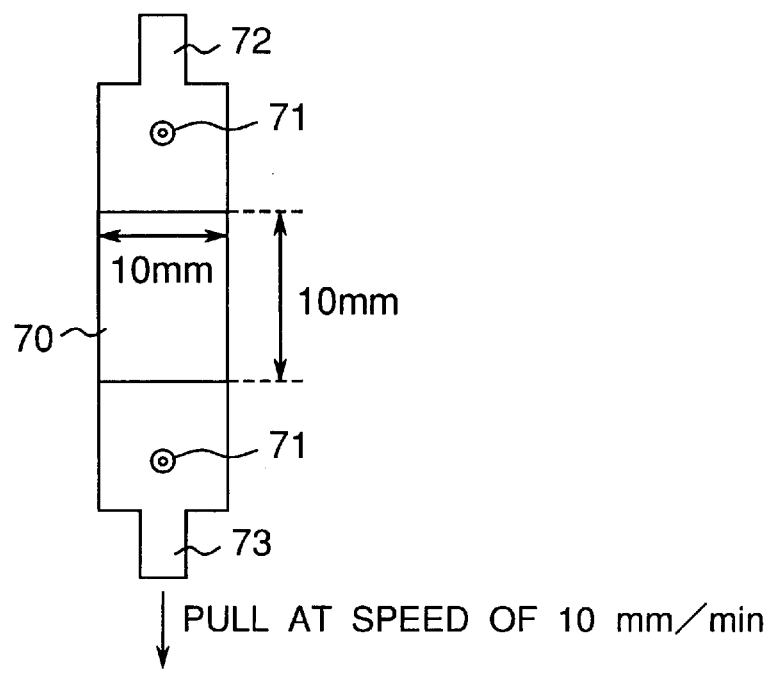
FIG. 27 is a plan view showing a portion for fixing the test specimen in the equipment for applying a load to the test specimen of the in-mold decorating sheet of the fourth embodiment of the present invention.

FIG. 16 is a sectional view showing an embodiment of the in-mold decorating sheet according to the fourth embodiment. FIGS. 17 to 19 are sectional views each showing one of the processes of the method for manufacturing the in-mold decorated article according to the fourth embodiment. FIG. 20 is a sectional view showing an in-mold decorated article obtained by the method for manufacturing the in-mold decorated article according to the fourth embodiment. FIG. 21 is a sectional view showing a three-dimensionally worked in-mold decorating sheet to be used in the method for manufacturing the in-mold decorated article according to the fourth embodiment different from the method by the processes of FIGS. 17 to 19. FIGS. 22 to 23 are sectional views each showing one of the processes of the method for manufacturing the in-mold decorated article according to the fourth embodiment, subsequent to the process of FIG. 21. FIG. 24 is a plan view showing a deep-drawn molded resin product shape for evaluation of three-dimensional molding. FIG. 25 is a sectional view showing the deep-drawn molded resin product shape for the evaluation of three-dimensional molding. FIG. 26 is a perspective view showing equipment for applying a load to the test specimen of the in-mold decorating sheet according to the fourth embodiment. FIG. 27 is a plan view showing a portion for fixing the test specimen in the equipment for applying a load to the test specimen of the in-mold decorating sheet according to the fourth embodiment. FIG. 28 is a sectional view showing the portion for fixing the test specimen in the equipment for applying a load to the test specimen of the in-mold decorating sheet according to the fourth embodiment. In the figures, reference numeral 51 denotes an in-mold decorating sheet; 52 denotes a base sheet of the in-mold decorating sheet 51; 53 denotes a metallic color layer formed on the base sheet 52; 54 denotes an adhesion layer formed on the metallic color layer; 55 denotes a movable mold of an injection mold; 56 denotes a stationary mold composing the injection mold in combination with the movable mold 55; 57 denotes a cavity forming surface of a cavity defined by the movable mold 55 and the stationary mold 56; 58 denotes a clamp member for clamping the in-mold decorating sheet 51 to the surface of the movable mold 55; 59 denotes a gate portion of the stationary mold 56; 60 denotes a molding resin to be injected into the cavity; 61 denotes a molded resin product formed by the molding resin 60; 62 denotes a vacuum suction hole of the movable mold 55; 63 denotes a cavity formed by the movable mold 55 and the stationary mold 56; 64 a hard coat layer formed on a surface of the base sheet 52 on one side opposite to the side on which the metallic color layer 53 is provided; 70 denotes a test specimen of the in-mold decorating sheet 51; 71 denotes a screw; 72 denotes a chuck; 73 denotes a chuck; and 74 denotes a movable member.

Figure 34:
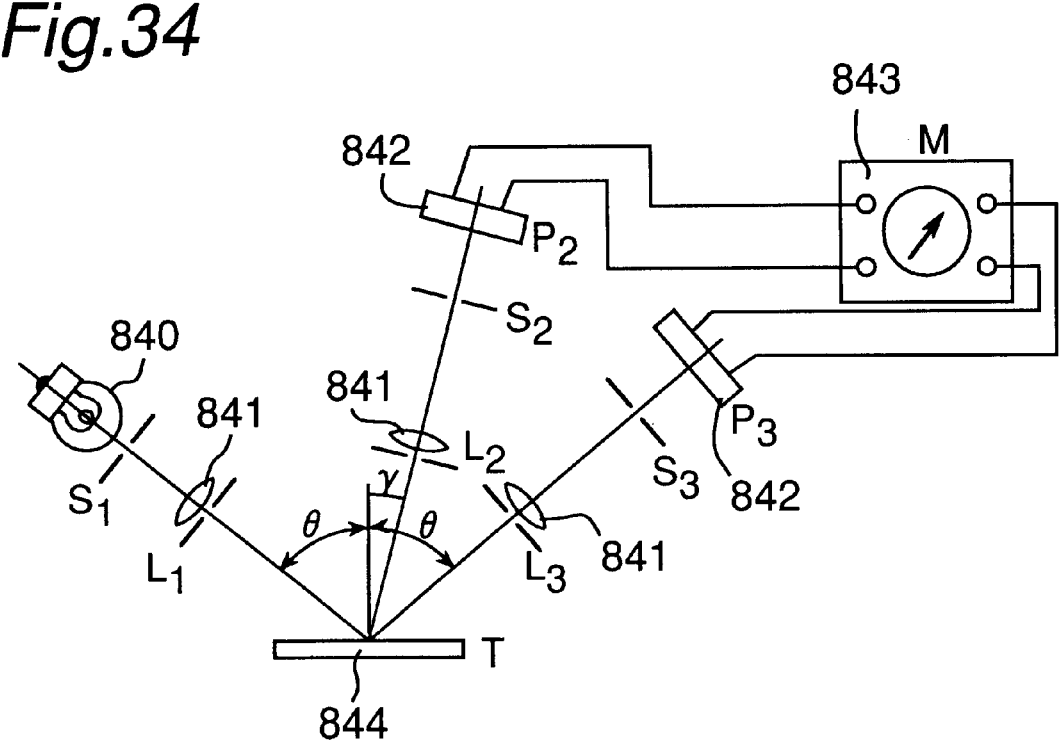
FIG. 34 is an explanatory view of equipment for measuring the surface specular gloss at 60° reflection according to JIS Z8741 (ASTM D523-62T).

The in-mold decorating sheet 51 is an in-mold decorating sheet 51 which comprises at least the base sheet 52 and the metallic color layer 53, and which is set into the injection mold and then integrally bonded to the surface of the molding resin 60, wherein when a 10 mm wide test specimen 70 of the in-mold decorating sheet 51 fixed between a pair of chucks 72, 73 with a chuck opposite end edge distance of 10 mm is elongated up to 20 mm by applying a load at a constant speed of 10 mm/min to one end of the test specimen 70 under an ambient temperature condition of 150° C. as shown in FIGS. 26–28, the in-mold decorating sheet 51 exhibits a surface specular gloss of not less than 75 at 60° reflection in compliance with the Japanese Industrial Standards (JIS) Z 8741 (ASTM D523-62T) (see FIG. 16). More specifically, measurement is made with a specular gloss meter 843 as shown in FIG. 34. A specimen 844 is irradiated with light from a light source 840 at a prescribed angle θ, and the intensity of light resulting when reflected light and incident light are received by a photodetector 842 at an equal angle is expressed by a value on the basis that the specular gloss of a glass surface having a refractive index of 1.567 is taken as 100 with the specular gloss meter 843. In this case, the measurement was done with a value of θ of 60°.

The inventor manufactured various metallic color layers 53 instead of the chromium vacuum-deposited coating. In order to select an in-mold decorating sheet 51 good at elongation and applicable to deep-drawn three-dimensional molded resin products from among those metallic color layers, the inventor examined the insert molding evaluation as to whether a successful deep-drawn metallic luster molded resin product can be obtained, as well as the performance of the in-mold decorating sheets 51, and considered the correlation between the evaluation and the performance.

The constitution of the in-mold decorating sheet 51 for the evaluation test was as follows. That is, a 2 μm thick anchor layer made of urethane resin ink was formed on a 125 μm thick base sheet 52 made of acrylic film by a gravure printing method, and then metallic color layers 53 of various thicknesses made of various materials were formed by a vacuum deposition process or a screen printing process, and then a 2 μm thick adhesive layer 54 made of vinyl-chloride acetate copolymer resin ink was formed by a gravure printing method.

As the method for investigating the performance of the in-mold decorating sheet 51, the in-mold decorating sheet 51 in a heated state was elongated with a load applied thereto, so that the metallic color layers 53 were subjected 10 to stresses, where the metallic color layers 53 were examined as to how the specular gloss of the metallic color layers 53 changed (see FIGS. 26 to 28). As the conditions for elongation, a 10 mm wide test specimen 70 of the in-mold decorating sheet 51 fixed between a pair of chucks 72, 73 with a chuck opposite end edge distance of 10 mm was elongated up to 20 mm by applying a load at a constant speed of 10 mm/nin to one end of the test specimen 70 under an ambient temperature condition of 150° C. In addition, in FIGS. 26 to 28, the upper-of-the-pair chuck 72 is fixed by the screw 71 with an upper end of the test specimen 70 pinched by the chuck 72. Also, the lower-of-the-pair chuck 73 is fixed by the screw 71 with a lower end of the test specimen 70 pinched by the chuck 73. As shown in FIG. 26, the upper-of-the-pair chuck 72 is fixed to the test equipment, while the lower-of-the-pair chuck 73 is lowered at a speed of 10 mm/min downward by the movable member 74 to exert a tensile force on the test specimen 70.

It is noted here that the ambient temperature refers to a temperature of the atmosphere in which the test specimen 70 is actually tested. In order that the test specimen 70 is elongated from 10 mm to 20 mm, it is necessary to set the ambient temperature to a temperature that allows a film having the highest softening point to be elongated. Therefore, by taking as the ambient temperature a temperature of 150° C., which is the softening point of polycarbonate film that has the highest softening point among the various types of films that can be used as the base sheet 52, various types of test specimens 70 can be easily elongated from 10 mm to 20 mm.

The test specimen 70 is prepared by cutting the in-mold decorating sheet into a 10 mm wide size which allows the test specimen to lend itself to the tensile test in which the test specimen is pinched between the pair of chucks 72, 73 with a chuck opposite end edge distance of 10 mm. The size of the test specimen 70 was adopted due to the following reasons. That is, when the test specimen 70 is subjected to an ambient temperature of 150° C., the test specimen 70 may, in some cases, curl at its edges depending on the type of the base sheet 52. This can be prevented by shortening the opposite end edge distance of the chucks. There is another problem that the test specimen 70, if large in width, can hardly be fixed so as to provide a shorter opposite end edge distance of chucks, which results in an insufficient repeatability of measurement data (surface specular gloss). It was investigated through trials and errors that a 10 mm×10 mm size of the test specimen 70 is appropriate in order that the test specimen 70 is free from curls, that the repeatability of measurement data is ensured, and that the surface specular gloss can be measured after the elongation.

In the elongation of the test specimen 70, too fast a speed of elongation would cause the test specimen 70 to be partly stressed so that measurement data would be liable not to vary greatly. Therefore, the test specimen 70 is preferably elongated as slow as the measuring equipment permits, where it was investigated through trials and errors that a constant speed of 10 mm/min for elongation is appropriate.

The configuration of deep-drawn molded resin products for evaluation of in-mold decoration was 40 mm long, 500 mm wide, and 13 mm high, having two circular projections each having a 20 mm diameter and a 20 mm height (see FIGS. 24 to 25).

Results of evaluation are as shown in Table 6 below:

TABLE 6

| Metallic color layer | Film thickness (μm) | Elongation test Specular gloss before test | Specular gloss after test | Result | Evaluation |
|---|---|---|---|---|---|
| Indium metal thin film | 0.005 | 88 | 86 | Transparent in places | ○ |
| | 0.01 | 98 | 94 | Good all over | ⊙ |
| | 0.03 | 99 | 95 | Good all over | ⊙ |
| | 0.06 | 92 | 89 | Good all over | ⊙ |
| | 0.08 | 80 | 74 | Discoloration | Δ |
| Aluminum metal thin film | 0.005 | 79 | 61 | Micro cracks all over | Δ |
| | 0.01 | 89 | 62 | Micro cracks all over | Δ |
| | 0.03 | 92 | 70 | Micro cracks all over | Δ |
| | 0.06 | 94 | 50 | Cracks all over | × |
| | 0.08 | 96 | 45 | Cracks all over | × |
| Tin metal thin film | 0.01 | 69 | 67 | Cracks all over | Δ |
| | 0.03 | 79 | 75 | Cracks at only periphery of projection | ○ |
| | 0.06 | 78 | 75 | Cracks at only periphery of projection | ○ |

TABLE 6-continued

| Metallic color layer | Film thickness (μm) | Elongation test | | Result | Evaluation |
|---|---|---|---|---|---|
| | | Specular gloss before test | Specular gloss after test | | |
| Aluminum metal powder ink film | 1.0 | 89 | 82 | Cracks at only periphery of projection | ○ |
| | 3.0 | 92 | 85 | Cracks at only periphery of projection | ○ |
| | 5.0 | 84 | 28 | Cracks all over | × |
| | 8.0 | 77 | 21 | Cracks all over | × |
| Chromium metal thin film (Comparative Example) | 0.005 | 72 | 55 | Cracks all over | × |
| | 0.01 | 89 | 65 | Cracks all over | Δ |
| | 0.03 | 90 | 59 | Cracks all over | × |
| | 0.06 | 94 | 28 | Cracks all over | × |
| | 0.08 | 99 | 25 | Cracks all over | × |

As a result of the evaluation test, as to in-mold decorating sheets having a characteristic that the surface specular gloss at 60° reflection according to the Japanese Industrial Standards (JIS) Z 8741 was not less than 75 as a surface specular gloss after the elongation test, decorated articles of deep-drawn three-dimensional molded resin products having metallic luster in appearance were able to be obtained. Among these, a 100–600 Å thick indium metal thin film was particularly good, visually showing a metallic luster equivalent to that of metallic plating. In-mold decorating sheets having a surface specular gloss of less than 75 yielded occurrences of micro cracks, thus being other than metallically lustrous.

As the in-mold decorating sheet 51, a transfer material and an insert material are usable.

The insert material is such that a metallic color layer 53 or the like is formed on the base sheet 52.

As the base sheet 52, usable are fluoric film, polyethylene terephthalate film, acrylic film, polypropylene film, thermoplastic elastomer film, polycarbonate film, polyamide film, acrylonitrile-butadiene-styrene film, acrylonitrile-styrene film, polystyrene film, polyurethane film, or the like, or complexes of these sheets, which are ones used as base sheets for ordinary insert materials. In particular, the base sheet 52 is preferably a noncrystalline polyester film, acrylic film, polycarbonate film, or the like each of which is superior in transparency and deep-drawable.

Further, when the insert material is used for exterior automotive trims, an acrylic film having the hard coat layer 64 formed on the top surface is preferably used as the base sheet 52 (see FIG. 16). The acrylic film is suitable because of the demand for high weather resistance which is required for exterior automotive trims, and the hard coat layer 64 is suitable because of higher wear resistance and marring resistance.

As the acrylic film, available are polymethyl methacrylate, polymethyl acrylate, or materials in which derivatives of these compounds are used as primary components and mixed with acrylic rubber or the like. Films in which an acrylic film is laminated with other films are also contained in the above acrylic film.

As the hard coat layer 64, preferably used are ultraviolet curable resin, electron-beam curable resin, thermoset resin and the like. In the case of a deep-drawn shape, because of the possibility that the hard coat layer 64 may fracture, giving rise to cracks, during the in-mold decorating process, A suitable materials are those which have flexibility during the in-mold decorating process, and which are acceleratedly cured by ultraviolet rays, electron beams or heat so as to be higher in hardness after the in-mold decorating process.

Resins having such properties are exemplified by various acrylate resins such as urethane acrylate resin or cyanoacrylate resin, various methacrylate resins such as polyester methacrylate resin, or polythiol compound resin. As the method for forming the hard coat layer 64, available are a printing method such as gravure printing or screen printing, and a coating method such as reverse coating or dip coating. The thickness of the hard coat layer 64 is preferably within a range of 0.1–50 μm. Thicknesses thinner than 0.1 μm of the hard coat layer 64 would cause the properties (marring resistance, wear resistance) to be almost similar to those in the case where the hard coat layer is absent, undesirably, while thicknesses beyond 50 μm would not find any general-purpose coating method.

The metallic color layer 53 is exemplified by a 50–800 Å thick indium metal thin film, a 300–600 Å thick tin metal thin film, a 1.0–3.0 μm thick metal powder ink film, or the like. The metal powder ink is preferably one composed of metal powder and resin binder, the metal powder being aluminum or other metal powder having such a particle size distribution that particles having an oblateness of 100–250 and a particle diameter of 4–45 μm occupy a content ratio of 99% or more. In particular, an indium metal thin film having a thickness of 100–600 Å is good and capable of providing a metallic luster equivalent to that of metal plating, visually. The metal thin film may be formed by a vacuum deposition process, a sputtering process, an ion plating process, or the like. The metal powder ink film may be formed by a printing process such as gravure printing or screen printing, or a coating process such as reverse coating or dip coating.

Further, the metallic color layer 53 may also be partly formed. An example of the case in which the metallic color layer 53 is partly formed is a method in which a solvent-soluble resin layer is formed in a portion where the metallic color layer 53 is unnecessary, and thereafter a metal thin film is formed all over thereon, and then an unnecessary metal thin film is removed together with the solvent-soluble resin layer by performing solvent cleaning. The solvent often used in this case is water or aqueous solution. Another example is that a metal thin film is formed all over, then a resist layer is formed in portions where the metal thin film is desired to remain, and the resist layer is removed by performing etching with acid or alkali. Also, the metallic color layer 53, when formed from a metal powder ink film, may be formed by patterning with a printing method.

In the process of providing the metallic color layer 53, a front anchor layer or a rear anchor layer may also be formed for enhancement of the adhesion of the metallic color layer 53. As the material of the front anchor layer and the rear anchor layer, appropriately usable are two-part setting urethane resin, thermosetting urethane resin, melamine resin, cellulose ester resin, chlorine-containing rubber-series resin, chlorine-containing vinyl resin, acrylic resin, epoxy resin, vinyl copolymer resin, or the like. As the method for forming the front anchor layer and the rear anchor layer, there are coating methods such as gravure coating, roll coating and comma coating, or printing methods such as gravure printing or screen printing.

The insert material may be provided with a pattern layer. The pattern layer is a layer to decorate the surface of an in-mold decorated article, specifically, for example, with patterns such as characters or symbols, or solid pattern, or patterns such as wood grain pattern or stone grain pattern. As the material of the pattern layer, usable is color ink containing: as binder, resin such as polyvinyl resin, polyamide resin, polyester resin, acrylic resin, polyurethane resin, polyvinyl acetal resin, polyester urethane resin, cellulose ester resin, or alkyd resin; and as colorant, suitable color pigment or dye. Such a pattern layer may be formed by an ordinary printing process such as offset printing, gravure printing, or screen printing, or a coating process such as roll coating or spray coating. The thickness of the pattern layer is preferably 0.120 $\mu$m. With an ordinary printing process, the thickness falls within this range.

The insert material may be provided with an adhesive layer 54. The adhesive layer 54 is purposed to adhere the insert material to the molding resin 60. As needed, the adhesive layer 54 is formed. As the adhesive layer 54, heat sensitizing or pressure sensitive resin suitable for material of the molding resin 60 is suitably used. For example, when the material of the molding resin 60 is acrylic resin, acrylic resin may be used for the adhesive layer 54. When the material of the molding resin 60 is polyphenylene oxide-polystyrene resin, polycarbonate resin, styrene copolymer resin, or polystyrene blend resin, the adhesive layer 54 may be used which is of acrylic resin, polystyrene resin, or polyamide resin each of which has affinity for these resins of the molding resin 60. When the material of the molding resin 60 is polypropylene resin, usable are, as the adhesive layer 54, chlorinated polyolefine resin, chlorinated ethylene-vinylacetate copolymer resin, cyclization rubber, or coumarone-indene resin. The adhesive layer 54 may be formed by coating methods such as gravure coating, roll coating and comma coating, or printing methods such as gravure printing or screen printing.

The transfer material is constructed by the peel layer, the metallic color layer 53, the adhesive layer 54, and the like which are formed on the base sheet 52.

As the base sheet 52, the same as the insert material of the aforementioned embodiment can be used. When the surface of the base sheet 52 has fine recesses and projections, such fine recesses and projections may be transferred onto the transfer layer to express surface configurations such as matting or hair lines.

In order to improve release properties of the transfer layer from the base sheet 52, a release layer may be formed on the base sheet 52 before the transfer layer is formed on the whole surface of the base sheet 52. The release layer is removed from the transfer layer together with the base sheet 52 when the base sheet 52 is released after the transfer operation is carried out simultaneously with the molding operation. As the material of the release layer, usable are melamine resin series releasing agent, fluororesin series releasing agent, cellulosicderivative series releasing agent, urea resin series releasing agent, polyolefine resin series releasing agent, paraffin series releasing agent, or complexed releasing agent of these agents. The release layer may be formed by coating methods such as roll coating or spray coating, or printing methods such as gravure printing or screen printing.

The peel layer is entirely or partially formed on the base sheet 52 or the release layer. The peel layer is the outermost layer of the to-be-transferred object by releasing the peel layer from the base sheet 52 or the release layer when the base sheet 52 is released after the transfer operation is carried out simultaneously with the molding operation. As the material of the peel layer, usable are resins such as acrylic resin, polyester resin, polyvinyl chloride resin, cellulose resin, rubbery resin, polyurethane resin, or polyvinyl acetate resin; or copolymers such as vinyl chloride-vinyl acetate copolymer resin, or ethylene-vinyl acetate copolymer resin. When it is necessary for the peel layer to have some hardness, a resin may be used which is selected from photo-setting resins such as an ultraviolet curing resin, a radiation curing resin such as electron radiation curing resin, or a thermosetting resin. The peel layer may be colored or non-colored. The peel layer may be formed by coating methods such as gravure coating, roll coating and comma coating, or printing methods such as gravure printing or screen printing.

The adhesive layer 54 is to bond the aforementioned individual layers to surfaces of to-be-transferred objects. The adhesive layer 54 is formed at portions that would be designed for bonding. That is, if bonding is desired all over, the adhesive layer 54 is formed all over on the metallic color layer 53. If bonding is desired partly, the adhesive layer 54 is formed partly on a the metallic color layer 53. The adhesive layer 54 may be provided in the same way as in the case of the insert material.

Also, the transfer material may be one having an anchor layer, a pattern layer, or the like. The pattern layer, the anchor layer, or the like may be provided in the same way as in the case of the insert material.

Next, the method for manufacturing the in-mold decorated article according to the fourth embodiment is described.

First, as shown in FIG. 17, the in-mold decorating sheet 51 is set onto the surface of the movable mold 55, which is an injection mold, by the clamp members 58.

A concrete example of the way of setting to the movable mold 55 is as follows. An in-mold decorating sheet 51 of long size is wound on roll shaft into a roll form once, and this roll form sheet is placed on a top portion of the movable injection mold 55 integrally movable with the movable mold 55. While being paid out from the roll form winding, the in-mold decorating sheet 51 is allowed to pass through the space between the shunted movable mold 55 and the stationary mold 56, by which the in-mold decorating sheet 51 is set to the movable mold 55 and the stationary mold 56, by which the in-mold decorating sheet 51 is set to the movable mold 55. In this case, after the use of the in-mold decorating sheet 51, the in-mold decorating sheet 51 may be wound up by the roll shaft of a film winding means installed below the movable injection mold 55 integrally movable with the movable mold 55. As another example, with the use of the in-mold decorating sheet 51 in a leaf form, the in-mold decorating sheet 51 may be set to the surface of the movable mold 55 by a robot or human hand. For the setting of the in-mold decorating sheet 51 to the surface of the movable mold 55, after the in-mold decorating sheet 51 is set to the surface of the movable mold 55, the position of the in-mold decorating sheet 51 relative to the surface of the movable mold 55 is determined by a positioning senor or the like, where the in-mold decorating sheet 51 may appropriately be pressed against the surface of the movable injection mold 55 with the upper-and-lower pair of rod-like claim members 58.

Then, as shown in FIG. 18, after the in-mold decorating sheet 51 is set to the surface of the movable mold 55 for injection molding, vacuum suction is carried out with the plurality of vacuum suction holes 62 formed in the movable injection mold 55 to cause the in-mold decorating sheet 51 to be along the cavity forming surface 57 of the movable mold 55, by which the in-mold decorating sheet 51 is worked into a three-dimensional shape conforming to the recessed portion of the movable injection mold 55, i.e. the cavity forming surface 57 of the cavity 63, as shown in FIG. 18. As a concrete example, a method available is as follows. The in-mold decorating sheet 51 set to the surface of the movable mold 55 is heated to a temperature equal to or higher than the softening point to become softened by means of a heating plate or the like inserted between the movable mold 55 and the stationary mold 56, the space between the recessed portion of the movable injection mold 55 and the in-mold decorating sheet 51 is tightly closed, and vacuum suction is carried out by evacuating the space through the plurality of vacuum suction holes 62 to cause the in-mold decorating sheet 51 to closely adhere to the interior surface (cavity forming surface 57) of the recessed portion of the movable injection mold 55. In three-dimensionally working, or in pressing and fixing the in-mold decorating sheet 51 with the clamp members 58, an unnecessary portion of the in-mold decorating sheet 51 may be punched out.

Alternatively, before the in-mold decorating sheet 51 is set to the surface on the movable injection mold 55, the in-mold decorating sheet 51 may be previously three-dimensionallyworked into a desired shape by using a separate three-dimensional working mold different from the movable mold 55 and the stationary mold 56 for injection molding, or after the in-mold decorating sheet 51 is punched out into a desired shape (see FIG. 21), the three dimensionally worked in-mold decorating sheet 51 may be fitted into the recessed portion of the movable mold 55 for injection molding (see FIG. 22). The terms, three dimensional working, in this case refers to changing the shape of the in-mold decorating sheet 51 from a planar state into a three-dimensional shape. The desired shape may be, for example, a configuration conforming to the cavity forming surface 57 of the movable mold 55 or the stationary mold 56 for injection molding. As the method for three dimensional working, there is a vacuum molding method, a pressure forming method, a pressing and molding method in which heated rubber is pressed against an object, a press molding method and the like. The vacuum molding method in this case is such that the in-mold decorating sheet 51 is heated to a temperature equal to or higher than the softening point to become softened, the space between the recessed portion of the vacuum forming mold and the in-mold decorating sheet 51 is tightly closed and vacuum suction is carried out to cause the in-mold decorating sheet 51 to closely adhere to the interior surface of the recessed portion of the vacuum forming mold, by which the in-mold decorating sheet 51 is formed into an in-mold decorating sheet having a three-dimensional shape conforming to the cavity defining surface 57 of the movable mold 55 for injection molding. For punching to a desired shape, there a Thomson punching method and pressing method using a mold. As the punched configuration, there are lines extending along an outer periphery of a given configuration, holes of a given shape, and the like. In three-dimensional working, punching may be carried out simultaneously.

Next, the movable mold 55 is moved to the stationary mold 56 and the movable mold 55 is clamped against the stationary mold 56. Then, the molding resin 60 in a molten state is injected from the gate portion 59 of the stationary mold 56 into the cavity 63 defined by the movable mold 55 and the stationary mold 56, and the molding resin 60 is solidified so that a molded resin product 61 is formed within the cavity 63, and simultaneously therewith the adhesive film side of the in-mold decorating sheet 51 is integrally bonded to the surface of the molded resin product (see FIGS. 19 and 23).

Thereafter, after the molded resin product 61 is removed from the movable mold 55, an unnecessary portion, for example, a portion of the in-mold decorating sheet 51 not bonded to the molded resin product 61 is removed (see FIG. 20). In addition, if the in-mold decorating sheet 51 is previously punched out into a desired shape as shown in FIG. 21 and as described above, the work of removing the unnecessary portion of the in-mold decorating sheet 51 is unnecessary.

The movable mold 55 and the stationary mold 56 as the injection mold are not particularly limited to the above embodiments. As the injection mold, a mold may be used which is composed of the stationary mold 56 having the gate portion 59 for injecting the molding resin 60 and the movable mold 55, and in which the stationary mold 56 and the movable mold 55, when clamped, form a singularity or plurality of cavities 63 surrounded by the cavity forming surface 57 of the stationary mold 56 and the cavity forming surface 57 of the movable mold 55. The in-mold decorating sheet 51 set within the cavity 63 defined by the movable mold 55 and the stationary mold 56 for injection molding covers the cavity forming surfaces 57. The cavity 63 may also be one which forms holes in the molded resin product 61. The recessed portion forming the cavity 63 may be formed in either the stationary mold 56 or the movable mold 55. The movable mold 55 or the stationary mold 56 may have the clamp members 58 which press and fix the in-mold decorating sheet 51 by the periphery of the recessed portion (see FIGS. 17 to 19). The clamp members 58 may otherwise be provided in the stationary mold 56.

The molding resin 60 is not particularly limited. Examples of the molding resin are acrylic resin, polystyrene resin, polyacrylonitrile styrene resin, polyacrylonitrile butadiene-styrene resin, and the like. Typical molding resin 60 to be used for interior automotive trims and exterior automotive trims is exemplified by talc-containing polypropylene resin, modified polypropylene resin, and the like.

Next, with the mold opened, the molded resin product 61 to which the in-mold decorating sheet 51 has been integrated and bonded is removed. In the case where the in-mold decorating sheet 51 is a transfer material, the base sheet 52 is peeled off. In this way, an in-mold decorated article can be obtained.

In addition, whereas the above description applies, as it is, to lateral type injection molding machines, the relationship between the stationary mold 56 and the movable mold 55 is reversed in the case of a vertical type injection molding machine. Also, the mold of the injection molding machine is applicable not only to two mold type but also three mold type similarly.

Examples related to the above embodiments are shown below.

EXAMPLE 1

Example for the Second Embodiment

A gold color automobile wheel cover was manufactured under the following conditions.

As the acrylic film for the acrylic printing insert film, an acrylic film having a shrinkage rate of 5/1000 and a thickness of 125 $\mu$m was used. A print layer using transparent yellow acrylic resin ink was formed as a first pattern layer on the acrylic film, a metal vacuum-deposited layer made of a 400 Å thick indium vacuum-deposition was formed on the first pattern layer, a print layer using vinyl resin ink containing an aluminum pigment (including a transparent yellow pigment) was formed as a second pattern layer on the metal vacuum-deposited layer, and a print layer using chlorinated polypropylene resin (degree of chlorination: 10%) was formed on the second pattern layer.

The acrylic printing insert film obtained in this way was inserted in an injection mold, and, after clamping, a polypropylene molding resin in molten state having a shrinkage rate of 8/1000 was injected into the cavity. The polypropylene molding resin was solidified to form a molded resin product, and the print layer side of the acrylic printing insert film was integrally bonded to the molded resin product. Thus, a gold color automobile wheel cover was obtained.

As the polypropylene molding resin in this case, a gray color one containing a filler material (content: 20 wt %) and ethylene-vinyl acetate copolymer resin (content: 5 wt %) was used.

EXAMPLE 2

Example for the Second Embodiment

A console panel of a wood grain pattern was manufactured under the following conditions.

As the acrylic film for the acrylic printing insert film, an acrylic film having a shrinkage rate of 5/1000 and a thickness of 125 μm was used. A wood-grain conductor pattern layer using vinyl resin ink containing a black pigment (carbon black) was formed as a first pattern layer on the acrylic film, a glitter pigment layer using vinyl resin ink containing a yellow pearl pigment was formed as a second pattern layer on the first pattern layer, and a wood-grain ground layer using chlorinated polypropylene resin ink (degree of chlorination: 5 wt %) containing a brown pigment (iron red) was formed as a third pattern layer on the second pattern layer.

The acrylic printing insert film obtained in this way was inserted in the injection mold, and, after the clamping, a polypropylene molding resin in a molten state having a shrinkage rate of 5/1000 was injected into the cavity. Simultaneously with the molding of a molded resin product, the molding resin was integrally bonded to the adhesive layer side of the acrylic printing insert film. Thus, the console panel was obtained.

As the polypropylene molding resin in this case, a brown color one containing a filler material (content: 30 wt %) and olefinic thermoplastic elastomer resin (content: 1 wt %) was used.

EXAMPLE 3

Example for the Third Embodiment

An insert film for an interior automobile wood-grain panel was manufactured under the following conditions.

With a 75 μm thick acrylic film used as the base sheet, a wood-grain conductor pattern layer using acrylic resin ink containing a black pigment and a wood-grain ground using acrylic resin ink (containing a brown pigment were formed on the acrylic film, respectively, by a gravure printing method, by which a pattern layer was formed. Then, an adhesive layer was formed by chlorinated polypropylene resin, by which an insert film was obtained.

The insert film obtained in this way exhibited a tensile strength at break of 0.6 kgf when a tensile test was carried out with a 10 mm wide test specimen of the insert film fixed between a pair of chucks with a chuck-to-chuck distance of 100 mm, by applying a load at a constant speed of 5 mm/sec to the test specimen at one end thereof under an ambient temperature condition of 25° C. Also, the insert film exhibited a tensile elongation at break of 190% when a tensile test was carried out with a 10 mm wide test specimen of the insert film fixed between a pair of chucks with a chuck-to-chuck distance of 100 mm, by applying a load at a constant speed of 3 mm/sec to the test specimen at one end thereof under an ambient temperature condition of 110° C. Further, the base sheet exhibited a tensile strength at break of 160 gf when a tensile test was carried out with a 10 mm wide test specimen of the base sheet fixed between a pair of chucks with a chuck-to-chuck distance of 100 mm, by applying a load at a constant speed of 1 m/min to the test specimen at one end thereof under an ambient temperature condition of 40° C.

Next, the insert film was set and fixed to the injection mold, and with polypropylene resin used as the molding resin, an insert molded resin product was obtained.

Then, as a result of trimming by manually pulling the insert film at a portion thereof that was not bonded to the molding resin, the insert film was able to be easily cut. Also, the interior automobile wood-grain panel which is an insert-molded article obtained in this way showed no occurrences of peeling at end portions of the trimming portion of the insert film, and was superior also in terms of appearance.

EXAMPLE 4

Example for the Third Embodiment

An insert film for an automobile meter panel was manufactured under the following conditions.

With a 50 μm thick frosted polycarbonate film used as the base sheet, a partially-removed tight-shield pattern layer using vinyl resin ink containing a black pigment and an outline character coloring layer using vinyl-series ink containing a white pigment were formed on the acrylic film, respectively, by a gravure printing method, by which a pattern layer was formed. Then, an adhesive layer was formed by acrylic resin ink, by which an insert film was obtained.

The insert film obtained in this way exhibited a tensile strength at break of 0.7 kgf when the same tensile test as in Example 1 was carried out. Also, the insert film exhibited a tensile elongation at break of 165%. Further, the base sheet exhibited a tensile strength at break of 970 gf when the same tensile test as in Example 1 was carried out.

Next, the insert film was set and fixed to the injection mold, and with polypropylene resin used as the molding resin, an insert molded resin product was obtained.

Then, as a result of trimming by a laser beam with the insert film at a portion thereof that was not bonded to the molding resin, the insert film was able to be cut with a lower amount of energy. Also, the automobile meter panel, which was an insert molded resin product obtained in the above manner, did not burn around the trimming portion, and was superior also in terms of appearance.

EXAMPLE 5

Example for the Third Embodiment

An insert film to be used for a card was manufactured under the following conditions.

With a 150 μm thick polyvinyl alcohol film used as the base sheet, a pattern layer using aqueous acrylic resin ink containing a pigment was formed on the base sheet by a gravure printing method, and then an adhesive layer using aqueous acrylic resin ink was formed, by which an insert film was obtained.

The insert film obtained in this way exhibited a tensile strength at break of 0.23 kgf when the same tensile test as in Example 1 was carried out. Also, the insert film exhibited a tensile elongation at break of 155%. Further, the base sheet exhibited a tensile strength at break of 1800 gf when the same tensile test as in Example 1 was carried out.

Next, the insert film was set and fixed to the injection mold, and with polylactic-acid biodegradable molding resin used as the molding resin, molding an insert molded resin product was obtained.

Then, as a result of trimming by a Thomson punching die of the insert film at a portion thereof that was not bonded to the molding resin, the insert film was able to be punched out with a relatively low pressing pressure. Also, a card, which was an insert molded resin product obtained in the above manner, was clean at the cutting surface at end portions and superior in terms of appearance.

EXAMPLE 6

Example for the Fourth Embodiment

A knob part for electric rice cookers was manufactured under the following conditions.

With a 100 $\mu$m thick low-crystallinity polypropylene film used as the base sheet, a peel layer using transparent urethane resin ink was formed on the base sheet, a 2 $\mu$m thick metallic color layer using aluminum metal powder ink for screen printing made by Teikoku Ink K. K. was formed on the peel layer, and a pattern layer using urethane resin ink containing a transparent yellow pigment and an aluminum pigment was formed on the metallic color layer. A 100 $\mu$m thick gray color low-crystallinity polypropylene film was laminated further thereon by a dry laminate process, by which an adhesive layer was formed. Thus, a transfer material was obtained.

The transfer material obtained in this way exhibited a surface specular gloss of 83 at 60° reflection according to the Japanese Industrial Standards (JIS) Z 8741 when a 10 mm wide test specimen of the transfer material pinched by a pair of chucks and fixed with a chuck opposite end edge distance of 10 mm was elongated up to 20 mm by applying a load at a constant speed of 10 mm/min to one end of the test specimen under an ambient temperature condition of 150° C.

The transfer material obtained in the above manner was set in a movable mold for injection molding, vacuum molded was carried out, and, after clamping, talc-containing polypropylene molding resin in a molten state was injected into the cavity. The polypropylene molding resin was solidified to form a molded resin product, and simultaneously therewith the adhesive layer side of the transfer material was integrally bonded to the surface of the molded resin product. Thus, a knob part for electric rice cookers was obtained.

The in-mold decorated article obtained in this way, which was a knob part for electric rice cookers, showed no occurrences of micro cracks in the metallic color layer, and had a superior metallic luster.

EXAMPLE 7

Example for the Fourth Embodiment

An automobile emblem was manufactured under the following conditions.

With a 100 $\mu$m thick mold-released noncrystalline polyethylene terepthalate film used as the base sheet, a peel layer using urethane acrylate resin ink was formed on the base sheet, a metallic color layer made of 400 Å thick tin vacuum-deposited layer was formed on the peel layer, a pattern layer using vinyl resin ink was formed on the metallic color layer, and an adhesive layer using transparent-and-colorless acrylic resin ink was formed on the pattern layer, by which a transfer material was obtained.

The transfer material obtained in this way exhibited a surface specular gloss of 75 at 60° reflection according to the Japanese Industrial Standards (JIS) Z 8741 when a 10 mm wide test specimen of the transfer material pinched by a pair of chucks and fixed with a chuck opposite end edge distance of 10 mm was elongated up to 20 mm by applying a load at a constant speed of 10 mm/min to one end of the test specimen under an ambient temperature condition of 150° C.

The transfer material obtained in the above manner was set in an injection molding movable mold, and vacuum molded and, after clamping, talc-containing polypropylene molding resin in a molten state was injected into the cavity. The polypropylene molding resin was solidified to form a molded resin product, and simultaneously therewith the adhesive layer side of the transfer material was integrally bonded to the surface of the molded resin product. Thereafter, the noncrystalline polyethylene terephthalate film was peeled off, and the peel layer was accelerated to set by irradiation of ultraviolet rays. Thus, an automobile emblem was obtained.

The in-mold decorated article obtained in this way, which was an automobile emblem, showed no occurrences of micro cracks in the metallic color layer, and had a superior metallic luster as well as a high surface strength. Example 8:

With a 100 $\mu$m thick acrylic film used as the base sheet, a polyester methacrylate resin ink layer was formed on one surface of the base sheet, while a metallic color layer made of a 300 Å thick indium vacuum-deposited layer was formed on the other surface, a pattern layer using chrome color vinyl resin ink was formed on the base sheet, and an adhesive layer for lamination using acrylic resin ink was formed on the pattern layer. A 100 $\mu$m thick urethane film was laminated further thereon by a dry laminate process to form an adhesion film layer, by which an insert material was obtained.

The insert material obtained in this way exhibited a surface specular gloss of 95 at 60° reflection according to the Japanese Industrial Standards (JIS) Z 8741 when a 10 mm wide test specimen of the insert material pinched by a pair of chucks and fixed with a chuck opposite end edge distance of 10 mm was elongated up to 20 mm by applying a load at a constant speed of 10 mm/min to one end of the test specimen under an ambient temperature condition of 150° C.

The insert material obtained in the above manner was set in a mold for vacuum molding and three-dimensionally worked, and the polyester methacrylate layer was accelerated to set by irradiating the surface of the insert material with an electron beam. Thereafter, the insert material was set in a mold for injection molding and, after clamping, talc-containing polypropylene molding resin in a molten state was injected into the cavity. The polypropylene molding resin was solidified to form a molded resin product, and simultaneously therewith the adhesive layer side of the insert material was integrally bonded to the surface of the molded resin product. Thus, a chrome color automobile grille was obtained.

The in-mold decorated article obtained in this way, which was a chrome color automobile grille, showed no occurrences of micro cracks in the metallic color layer, and had a superior metallic luster as well as a high surface strength.

The present invention, by virtue of its constitutions as described above, has the following effects.

That is, according to the present invention, it is so constructed when an unnecessary portion of the in-mold decorating sheet is peeled off from the surface of the molded resin product in compliance with conditions of JIS K 6744-1992 (ASTM D903), the in-mold decorating sheet has a peel strength of at least not less than 1 kgf/inch width or the in-mold decorating sheet breaks before reaching the peel strength. The peel strength value of at least not less than 1 kgf/inch width was obtained from experimental values derived from a test carried out as to the trimming ease or difficulty with a test product as shown in FIG. 12, where it could not be said that a stable production of products is achievable, unless those products show a product yield of 85% or more as shown in Tables 2 to 4. Accordingly, with the above constitution, there occur neither trimming faults nor peeling of the in-mold decorating sheet from the molded resin product during the trimming work.

Also, with the setting that the difference between the shrinkage rate of the in-mold decorating sheet and the shrinkage rate of the after-solidifying molding resin is as small as within a range of 0/1000–8/1000, warp is unlikely to occur over the whole in-mold decorated article and the in-mold decorating sheet is also unlikely to peel off from the molded resin product. Further, at end portions of the in-mold decorated article, minute shifts are unlikely to occur at the bonding surface of the in-mold decorating sheet and the bonding surface of the molded resin product of the solidified molding resin so that such faults as peel-off of the in-mold decorating sheet from the molded resin product are eliminated.

Also, the in-mold decorating sheet according to the present invention is an in-mold decorating sheet which is set in a mold for a molding process, partly integrally bonded to the surface of molding resin, and after molding, an unbonded portion of the sheet is removed, wherein when a tensile test is carried out with a 10 mm wide test specimen of the in-mold decorating sheet fixed between a pair of chucks with a chuck-to-chuck distance of 100 mm, by applying a load at a constant speed of 5 mm/sec to the test specimen at one end thereof under an ambient temperature condition of 25° C., the test specimen exhibits a tensile strength at break of 0.2–2 kgf The setting that the tensile strength at break of the test specimen is 0.2–2 kgf is based on the fact that, as shown in Table 1 before, as a result of evaluating trimming characteristics of various types of base sheets, in-mold decorating sheets are evaluated as θ or 0 for those having a tensile strength at breaks of 0.2–1.6 kgf, as Δ for 2.0 kgf, as x for 2.1 kgf, and as x also for 0.18 gf, hence an effective range of 0.2–2 kgf However, in-mold decorating sheets having a tensile strength at break of less than 0.2 kgf broke at a time point during printing, being evaluated as x because of incapability of production of the sheets so that the evaluation of trimming characteristic was disabled. With this constitution, the in-mold decorating sheet has such a strength as to be easy to cut and moreover not to break during the molding process, and can produce an excellent effect of being easy to trim.

Also, the in-mold decorating sheet according to the present invention comprises at least a base sheet and a metallic color layer. The sheet is set in a mold for a molding process and integrally bonded to the surface of molding resin, wherein when a 10 mm wide test specimen of the in-mold decorating sheet fixed between a pair of chucks with a chuck opposite end edge distance of 10 mm is elongated up to 20 mm by applying a load at a constant speed of 10 mm/min to one end of the test specimen under an ambient temperature condition of 150° C., the in-mold decorating sheet exhibits a surface specular gloss of not less than 75 at 60° C. reflection according to the Japanese Industrial Standards (JIS) Z 8741. This setting that the surface specular gloss is not less than 75 is due to the fact that the surface specular gloss of 75 is a value around the boundary at which man can visually recognize whether or not there is a luster, and that man does not sense a feeling of luster any more if the surface specular gloss is less than this value. Accordingly, with this constitution, the in-mold decorating sheet is enabled to serve for decoration without impairing the metallic luster even if the in-mold decorating sheet is molded by deep-drawing. Further, the method for manufacturing the in-mold decorated article according to the present invention is capable of obtaining the in-mold decorated article without impairing the metallic luster even if the in-mold decorated article is molded by deep drawing.

With a constitution that the molding resin being polypropylene resin as in the aforementioned fifth or twentieth aspect, there can be produced effects that the molding resin, when being polypropylene, can be reduced in weight, the molding resin material itself is low in cost, and that no harmful gases are evolved during incineration or other disposal processes.

With a constitution that the molding resin is polypropylene resin having an after-solidifying shrinkage rate of 4/1000–12/1000 as in the aforementioned sixth or twenty-first aspect, the in-mold decorating sheet can be reduced in molding faults such as shrinkage, and moreover errors of product dimensions can be reduced.

With a constitution that a filler material is mixed into the polypropylene molding resin as in the aforementioned seventh or twenty-second aspect, there can be produced an effect that whereas the polypropylene resin itself has a large shrinkage rate of molding, the shrinkage rate can be reduced by mixing the filler material thereinto.

With a constitution that a rubber component is mixed into the polypropylene molding resin as in the aforementioned eighth or twenty-third aspect, the molded resin product can be reduced in strain, which produces an effect that the adhesive force with the in-mold decorating sheet is improved.

With a constitution that a resin component of a layer bringing into contact with the molding resin out of print layers of the in-mold decorating sheet is chlorinated polypropylene-series resin as in the aforementioned ninth or twenty-fourth aspect, the chlorinated polypropylene-series resin is a resin that adheres to polypropylene molding resin very strongly, and that has a property that, when mixed with a rubber component, is further improved in adhesive force. Accordingly, there can be produced an effect that the in-mold decorating sheet becomes more unlikely to be peeled off from the molding resin.

With a constitution that, as in the aforementioned tenth or twenty-fifth aspect, the in-mold decorating sheet has at least a pattern layer formed in a base sheet, wherein when a tensile test is carried out with a 10 mm wide test specimen of the base sheet fixed between a pair of chucks with a chuck-to-chuck distance of 100 mm, by applying a load at a constant speed of 500 mm/min to the test specimen at one end thereof under an ambient temperature condition of 40° C., the test specimen exhibits a tensile strength at break of not less than 850 gf, there can be produced an effect that, because of the tensile strength at break of not less than 850 kgf of the base sheet, such faults as damage in handling for printing are unlikely to occur.

With a constitution that, as in the aforementioned eleventh or twenty-sixth aspect, the in-mold decorating sheet has such a characteristic that when a tensile test is carried out with a 10 mm wide test specimen of the in-mold decorating sheet fixed between a pair of chucks with a chuck-to-chuck distance of 100 mm, by applying a load at a constant speed of 3 mm/sec to the test specimen at one end thereof under an ambient temperature condition of 110° C., the test specimen exhibits a tensile elongation at break of not less than 150%, there can be produced an effect that, because of the tensile elongation at break of not less than 150% at 110° C., a deep-drawn decorated article of 150% or more can be obtained in the case of working with heating as in vacuum molding.

With a constitution that, as in the aforementioned twelfth or twenty-seventh aspect, the base sheet of the in-mold decorating sheet is an acrylic film having a thickness of 50–200 μm or a polycarbonate film having a thickness of 30–150 μm, and with a constitution that, as in the thirty-fourth or thirty-sixth aspect, the pattern layer is an organic-solvent soluble ink layer, there can be produced effects that the tensile strength at break is high before printing, and that the film strength can be lowered appropriately by the organic solvent contained in the ink after the printing, thus preventing damage in handling for printing, making the film easy to cut, so easy to trim, in the trimming work after the in-mold decoration.

With a constitution that the base sheet of the in-mold decorating sheet is a polyvinyl alcohol film having a thickness of 50–800 μm as in the aforementioned thirteenth or twenty-eighth aspect, and with a constitution that the pattern layer is a water-soluble ink layer as in the aforementioned thirty-fifth or thirty-seventh aspect, there can be produced effects that the tensile strength at break is high before printing, and that the film strength can be lowered appropriately by water or hydrophilic solvent (methanol etc.) contained in the ink after the printing, thus reducing damage in handling for printing, making the film easy to cut, so easy to trim, in the trimming work after the in-mold decoration.

With a constitution that, as in the aforementioned fourteenth or twenty-ninth aspect, the in-mold decorating sheet comprises at least a base sheet and a metallic color layer, the metallic color layer being a 50–800 Å thick indium metal thin film, a 300–600 Å thick tin metal thin film, or a 1.0–3.0 μm thick metal powder ink film, there can be obtained a metallic lustrous film having a surface specular gloss of not less than 75 as shown in the fourth aspect.

With a constitution that, as in the aforementioned fifteenth or thirtieth aspect, the in-mold decorating sheet comprises at least a base sheet and a metallic color layer, the metallic color layer being a 100–600 Å thick indium metal thin film, the surface specular gloss can be further improved to above 75.

With a constitution that, as in the aforementioned thirty-first aspect, the three-dimensionally worked in-mold decorating sheet as described in any one of the sixteenth to thirtieth aspects is set into a mold for a molding process, and with the mold clamped, simultaneously with forming a molded resin product, the in-mold decorating sheet is integrally bonded to a surface of the molded resin product, there can be produced an effect that, because of the integral bonding performed simultaneously with molding, the processes can be simplified.

With a constitution that, as in the aforementioned thirty-second aspect, the in-mold decorating sheet as described in any one of the sixteenth to thirtieth aspects is set into a mold for a molding process, three-dimensionally worked within the mold, and with the mold clamped, simultaneously with forming a molded resin product, the in-mold decorating sheet is integrally bonded to a surface of the molded resin product, there can be produced an effect that, because of the method in which the in-mold decorating sheet is three-dimensionally worked within the mold, one mold can serve for three-dimensional working and injection molding so that the processes can be simplified.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An article produced by the process of:
    positioning a decorating sheet in an injection mold;
    closing the injection mold;
    injecting molten resin into the injection mold;
    cooling and solidifying the molten resin into a solid body such that a fist portion of the decorating sheet is integrally bonded to the solid body and a second portion of the decorating sheet, that is co-extensive with the first portion, is not bonded to the solid body; and then
    removing the second portion of the decorating sheet from the fist portion of the decorating sheet while maintaining the fist portion of the decorating sheet bonded to the solid body,
    wherein the decorating sheet has a peel strength of at least 1 kgf/inch width in accordance with ASTM D903, or
    wherein when the peel strength of the decorating sheet is being determined in accordance with ASTM D903 by peeling a test decorating sheet from an interface with a test solidified body of the resin, the test decorating sheet breaks at the interface before the peel strength can be determined.

2. The article according to claim 1, wherein a difference in shrinkage rates between the decorating sheet and the solid body is from 0/1000 to 8/1000.

3. The article according to claim 1, wherein the decorating sheet has properties such that when a 10 mm wide test specimen of the decorating sheet is fixed between a pair of chucks with an opposite edge distance of 100 mm and then a load is applied at a constant speed of 5 mm/sec to the test specimen at one end thereof under a temperature of 25° C., the test specimen exhibits a tensile strength at breakage thereof of from 0.2 kgf to 2.0 kgf.

4. The article according to claim 1, wherein the decorating sheet comprises at least a base sheet and a metallic color layer and has properties such that when a 10 mm wide test specimen of the decorating sheet is fixed between a pair of chucks with an opposite edge distance of 10 mm and then a load is applied at a constant speed of 10 mm/sec to the test specimen at one end thereof under a temperature of 150° C. whereby the test specimen is elongated up to 20 mm, the test specimen exhibits a surface specular gloss of at least 75 at 60° reflection.

5. The article according to claim 1, wherein the resin comprises a polypropylene resin.

6. The article according to claim 1, wherein the resin comprises a polypropylene resin having an after-solidifying shrinkage rate of from 4/1000 to 12/1000.

7. The article according to claim 1, wherein the resin comprises a polypropylene resin having a filler material mixed therein.

8. The article according to claim 1, wherein the resin comprises a polypropylene resin having a rubber component mixed therein.

9. The article according to claim 1, wherein the decorating sheet includes a layer comprising a chlorinated polypropylene-series resin that contacts the molten resin in the injection mold.

10. The article according to claim 1, wherein the decorating sheet comprises at least a pattern layer formed on a base sheet and has properties such that when a 10 mm wide test specimen of the decorating sheet is fixed between a pair of chucks with a chuck-to-chuck distance of 100 mm and then a load is applied at a constant speed of 500 mm/sec to the test specimen at one end thereof under a temperature of 40° C., the test specimen exhibits a tensile strength at breakage thereof of at least 850 gf.

11. The article according to claim 10, wherein the pattern layer comprises an organic-solvent soluble ink layer.

12. The article according to claim 10, wherein the pattern layer comprises a water-soluble ink layer.

13. The article according to claim 1, wherein the decorating sheet has properties such that when a 10 mm wide test specimen of the decorating sheet is fixed between a pair of chucks with a chuck-to-chuck distance of 100 mm and then a load is applied at a constant speed of 3 mm/sec to the test specimen at one end thereof under a temperature of 110° C., the test specimen exhibits a tensile elongation at breakage thereof of at least 150%.

14. The article according to claim 1, wherein the decorating sheet includes an acrylic base sheet having a thickness of from 50 μm to 200 μm or a polycarbonate base sheet having a thickness of from 30 μm to 150 μm.

15. The article according to claim 1, wherein the decorating sheet includes a polyvinyl alcohol base sheet having a thickness of from 50 μm to 800 μm.

16. The article according to claim 1, wherein the decorating sheet comprises at least a base sheet and a metallic color layer, with the metallic color layer comprising an indium metal film having a thickness of from 50 Å to 800 Å, a tin film having a thickness of from 300 Å to 600 Å, or a metal powder ink film having a thickness of from 1.0 μm to 3.0 μm.

17. The article according to claim 1, wherein the decorating sheet comprises at least a base sheet and a metallic color layer, with the metallic color layer comprising an indium metal film having a thickness of from 100 Å to 600 Å.

18. A decorating sheet for use in the production of an article that is produced by the process of:

positioning the decorating sheet in an injection mold, closing the injection mold, injecting molten resin into the injection mold, cooling and solidifying the molten resin into a solid body such that a fist portion of the decorating sheet is integrally bonded to the solid body and a second portion of the decorating sheet, that is co-extensive with the fist portion, is not bonded to the solid body, and then removing the second portion of the decorating sheet from the fist portion of the decorating sheet while maintaining the first portion of the decorating sheet bonded to the solid body, wherein the decorating sheet has a peel strength of at least 1 kgf/inch width in accordance with ASTM D903, or wherein when the peel strength of the decorating sheet is being determined in accordance with ASTM D903 by peeling a test decorating sheet from an interface with a test solidified body of the resin, the test decorating sheet breaks at the interface before the peel strength can be determined.

19. The decorating sheet according to claim 18, wherein a difference in shrinkage rates between the decorating sheet and the solid body is from 0/1000 to 8/1000.

20. The decorating sheet according to claim 18, wherein the decorating sheet has properties such that when a 10 mm wide test specimen of the decorating sheet is fixed between a pair of chucks with an opposite edge distance of 100 mm and then a load is applied at a constant speed of 5 mm/sec to the test specimen at one end thereof under a temperature of 25° C., the test specimen exhibits a tensile strength at breakage thereof of from 0.2 kgf to 2.0 kgf.

21. The decorating sheet according to claim 18, wherein the decorating sheet comprises at least a base sheet and a metallic color layer and has properties such that when a 10 mm wide test specimen of the decorating sheet is fixed between a pair of chucks with an opposite edge distance of 10 mm and then a load is applied at a constant speed of 10 mm/sec to the test specimen at one end thereof under a temperature of 150° C. whereby the test specimen is elongated up to 20 mm, the test specimen exhibits a surface specular gloss of at least 75 at 60° reflection.

22. The decorating sheet according to claim 18, wherein the resin comprises a polypropylene resin.

23. The decorating sheet according to claim 18, wherein the resin comprises a polypropylene resin having an after-solidifying shrinkage rate of from 4/1000 to 12/1000.

24. The decorating sheet according to claim 18, wherein the resin comprises a polypropylene resin having a filler material mixed therein.

25. The decorating sheet according to claim 18, wherein the resin comprises a polypropylene resin having a rubber component mixed therein.

26. The decorating sheet according to claim 18, wherein the decorating sheet includes a layer comprising a chlorinated polypropylene-series resin that contacts the molten resin in the injection mold.

27. The decorating sheet according to claim 18, wherein the decorating sheet comprises at least a pattern layer formed on a base sheet and has properties such that when a 10 mm wide test specimen of the decorating sheet is fixed between a pair of chucks with a chuck-to-chuck distance of 100 mm and then a load is applied at a constant speed of 500 mm/sec to the test specimen at one end thereof under a temperature of 40° C., the test specimen exhibits a tensile strength at breakage thereof of at least 850 gf.

28. The decorating sheet according to claim 27, wherein the pattern layer comprises an organic-solvent soluble ink layer.

29. The decorating sheet according to claim 27, wherein the pattern layer comprises a water-soluble ink layer.

30. The decorating sheet according to claim 18, wherein the decorating sheet has properties such that when a 10 mm wide test specimen of the decorating sheet is fixed between a pair of chucks with a chuck-to-chuck distance of 100 mm and then a load is applied at a constant speed of 3 mm/sec to the test specimen at one end thereof under a temperature of 110° C., the test specimen exhibits a tensile elogation at breakage thereof of at least 150%.

31. The decorating sheet according to claim 18, wherein the decorating sheet includes an acrylic sheet having a thickness of from 50 μm to 200 μm or a polycarbonate base sheet having a thickness of from 30 μm to 150 μm.

32. The decorating sheet according to claim 18, wherein the decorating sheet includes a polyvinyl alcohol base sheet having a thickness of from 50 μm to 800 μm.

33. The decorating sheet according to claim 18, wherein the decorating sheet comprises at least a sheet and a metallic color layer, with the metallic color layer comprising an indium metal film having thickness of from 50 Å to 800 Å, a tin film having a thickness of from 300 Å to 600 Å, or a metal powder ink film having a thickness of from 1.0 μm to 3.0 μm.

34. The decorating sheet according to claim 18, wherein the decorating sheet comprises at least a base sheet and a metallic color layer, with the metallic color layer comprising an indium metal film having thickness of from 100 Å to 600 Å.

* * * * *